United States Patent [19]
Lusignan

[11] Patent Number: 5,930,680
[45] Date of Patent: Jul. 27, 1999

[54] METHOD AND SYSTEM FOR TRANSCEIVING SIGNALS USING A CONSTELLATION OF SATELLITES IN CLOSE GEOSYNCHRONOUS ORBIT

[75] Inventor: Bruce B. Lusignan, Palo Alto, Calif.

[73] Assignee: Terrastar, Inc., Chicago, Ill.

[21] Appl. No.: 08/781,158

[22] Filed: Jan. 9, 1997

Related U.S. Application Data

[62] Division of application No. 08/259,980, Jun. 17, 1994.

[51] Int. Cl.$^6$ ............................ H04B 7/185; H01Q 19/12
[52] U.S. Cl. ......................... 455/12.1; 455/3.2; 455/269; 455/288; 343/840
[58] Field of Search .................................... 455/3.2, 12.1, 455/13.1, 13.2, 13.3, 25, 63, 66, 562, 269, 272, 276.1, 278.1, 279.1, 280, 286, 288, 290; 375/272; 343/758, 840, 781 R, 912, 914

[56] References Cited

U.S. PATENT DOCUMENTS

| | | | |
|---|---|---|---|
| H739 | 2/1990 | Gutleber | 343/384 |
| H740 | 2/1990 | Gutleber | 342/384 |
| Re. 32,905 | 4/1989 | Baran | 370/104 |
| Re. 34,410 | 10/1993 | Rosen | 343/781 |
| 3,273,144 | 9/1966 | Fishbein | 343/5 |
| 3,308,465 | 3/1967 | Tamama | 343/100 |
| 3,680,147 | 7/1972 | Redlich | 343/792 |
| 3,916,414 | 10/1975 | Trigon et al. | 343/727 |
| 4,052,723 | 10/1977 | Miller | 343/100 |
| 4,079,380 | 3/1978 | Esry et al. | 343/100 |
| 4,085,368 | 4/1978 | Yeh | 325/304 |
| 4,112,721 | 9/1978 | Takase et al. | 72/12 |
| 4,129,873 | 12/1978 | Kennedy | 343/854 |
| 4,145,658 | 3/1979 | Acampora et al. | 325/180 |
| 4,152,702 | 5/1979 | Piesinger | 343/100 |
| 4,155,092 | 5/1979 | Blaese | 343/799 |
| 4,213,133 | 7/1980 | Hidaka | 343/854 |
| 4,249,181 | 2/1981 | Lee | 343/100 |
| 4,250,506 | 2/1981 | McNaul | 343/100 |
| 4,343,005 | 8/1982 | Han et al. | 343/781 |

(List continued on next page.)

FOREIGN PATENT DOCUMENTS

| 529 210 | 8/1956 | Canada . |
| 2 729 973 | 10/1989 | France . |
| 6-276527 | 9/1994 | Japan . |

*Primary Examiner*—Wellington Chin
*Assistant Examiner*—Philip J. Sobutka
*Attorney, Agent, or Firm*—Kenyon & Kenyon

[57] ABSTRACT

A C-Band or Ku-Band satellite communication system uses a relatively small receiving antenna while operating within current FCC designated bandwidth and using existing satellite configurations. Aperture synthesis techniques create nulls in orbit locations from which potential interference is expected. Bandwidth inefficient modulation techniques reduce transmission power flux density. Video compression reduces the power necessary to transmit video information. These three features make possible a receiving antenna with a receiving area equivalent to that of a three foot diameter dish, at C-Band frequencies. Comparable reductions are possible for Ku-, Ka-, Sand L-Band systems. Compressing the data reduces the required transmitted power by a factor of ten. Spreading the bandwidth reduces the power density below the FCC limitation. However, reducing the antenna diameter increases the beam width of the antenna, hence, the smaller antenna can no longer discriminate between adjacent C-Band satellites in their current orbital configuration. By designing the receiving antenna with nulls in orbital locations where potentially interfering satellites would be located, the small antenna avoids this interference. The same general technique is possible for a Ku-Band Antenna system. The FCC power limits are higher at Ku-Band than C-Band, however, losses due to rain absorption and thermal noise are higher at Ku-Band frequencies. Nevertheless, equivalent size savings on Ku-Band antennas are possible with the combination of the above techniques, when tailored for the Ku-Band environment.

10 Claims, 12 Drawing Sheets

U.S. PATENT DOCUMENTS

| | | | |
|---|---|---|---|
| 4,376,940 | 3/1983 | Miedema | 343/840 |
| 4,479,129 | 10/1984 | Skahill | 343/781 |
| 4,567,485 | 1/1986 | Oshima et al. | 343/358 |
| 4,573,051 | 2/1986 | Farina | 343/781 P |
| 4,651,155 | 3/1987 | Baurle et al. | 342/378 |
| 4,748,636 | 5/1988 | Kato | 375/1 |
| 4,771,289 | 9/1988 | Masak | 342/383 |
| 4,791,428 | 12/1988 | Anderson | 343/758 |
| 4,811,021 | 3/1989 | Schreiber | 375/1 |
| 4,837,786 | 6/1989 | Gurantz et al. | 370/20 |
| 4,870,424 | 9/1989 | Lalezari et al. | 343/379 |
| 4,901,307 | 2/1990 | Gilhousen et al. | 370/18 |
| 4,905,221 | 2/1990 | Ishiyoshi | 370/18 |
| 4,941,048 | 7/1990 | Hartson et al. | 358/181 |
| 4,968,969 | 11/1990 | Drabowitch et al. | 342/188 |
| 4,985,706 | 1/1991 | Schukat | 342/352 |
| 4,985,772 | 1/1991 | Long et al. | 358/181 |
| 5,073,900 | 12/1991 | Mallinckrodt | 375/1 |
| 5,083,205 | 1/1992 | Tsutomu | 358/140 |
| 5,119,104 | 6/1992 | Heller | 342/450 |
| 5,127,021 | 6/1992 | Yoshimoto et al. | 342/361 |
| 5,177,604 | 1/1993 | Martinez | 358/86 |
| 5,189,433 | 2/1993 | Stern et al. | 343/770 |
| 5,191,350 | 3/1993 | Hemmie | 343/840 |
| 5,231,494 | 7/1993 | Wachob | 358/146 |
| 5,237,610 | 8/1993 | Gammie et al. | 380/10 |
| 5,243,353 | 9/1993 | Nakahara et al. | 343/700 |
| 5,257,106 | 10/1993 | Maruoka | 358/191 |
| 5,262,788 | 11/1993 | Drabowitch et al. | |
| 5,280,297 | 1/1994 | Profera, Jr. | 343/754 |
| 5,283,591 | 2/1994 | Delmas | 343/755 |
| 5,289,285 | 2/1994 | Kotaka et al. | 348/138 |
| 5,289,497 | 2/1994 | Jacobson et al. | 375/1 |
| 5,296,862 | 3/1994 | Rodeffer et al. | 342/359 |
| 5,309,167 | 5/1994 | Cluniat et al. | 343/840 |
| 5,345,473 | 9/1994 | Berg | 375/6 |
| 5,345,591 | 9/1994 | Tsurumaki et al. | 375/259 |
| 5,351,057 | 9/1994 | Hansen | 343/100 |
| 5,351,060 | 9/1994 | Bayne | 343/766 |
| 5,355,512 | 10/1994 | Profera, Jr. | 455/13.3 |
| 5,361,099 | 11/1994 | Kim | 348/555 |
| 5,376,941 | 12/1994 | Fukazawa et al. | 342/357 |
| 5,379,320 | 1/1995 | Fernandes et al. | 375/1 |
| 5,386,202 | 1/1995 | Cochran et al. | 375/272 X |
| 5,386,226 | 1/1995 | Chanteau | 348/10 |
| 5,386,587 | 1/1995 | Yuzawa | 455/3.2 |
| 5,414,431 | 5/1995 | McCoskey | 342/352 |
| 5,416,534 | 5/1995 | Hayashi et al. | 348/687 |
| 5,418,815 | 5/1995 | Ishikawa et al. | 375/216 |
| 5,438,590 | 8/1995 | Tzukerman et al. | 375/259 |
| 5,455,960 | 10/1995 | Pelchat et al. | 455/12.1 |
| 5,461,427 | 10/1995 | Duffield et al. | 348/555 |
| 5,491,472 | 2/1996 | Kurtz | 340/825.57 |
| 5,512,913 | 4/1996 | Staney | 343/840 X |
| 5,583,562 | 12/1996 | Birch et al. | 455/3.2 X |
| 5,625,624 | 4/1997 | Rosen et al. | 455/13.3 X |

METHOD AND SYSTEM FOR TRANSCEIVING SIGNALS USING A CONSTELLATION OF SATELLITES IN CLOSE GEOSYNCHRONOUS ORBIT

This is a division of application Ser. No. 08/259,980, filed Jun. 17, 1994.

BACKGROUND OF THE INVENTION

The present invention relates generally to satellite communication systems, and more particularly to a satellite communication system for communicating signals from a satellite within a constellation of satellites to multiple terrestrial antennas, which satellites transmit different signals simultaneously at designated frequencies, such as C-, Ku-, S-, L- and Ka-Band frequencies, but which frequencies are often nearly identical. The present invention also relates generally to terrestrial antennas for receiving signals from satellites, and more particularly to a terrestrial antenna for receiving a signal being transmitted from a satellite within a constellation of satellites, which transmit television signals in designated frequency bands, such as C-, Ku-, S-, L- and Ka-Bands. Finally, the present invention relates to the components for use in the above mentioned satellite communication system, such as the receiver, the transmitters and the associated satellites.

Television has evolved from a local broadcasting concept to a system in which a viewer may receive television signals from a variety of sources. Today, television viewers receive programming from at least one of several different methods, such as direct "over-the-air" broadcasts from local television stations, transmission over land cables, i.e., cable television (CATV), transmission over microwave systems, and direct to home (DTH) broadcast via satellite.

Television viewers may receive DTH satellite broadcasts by purchasing home satellite dish equipment, however, current satellite television communication systems operate with receiving antennas that are relatively large, e.g., on the order of 10 feet in diameter or more for current C-Band parabolic dishes. At lower satellite frequencies the receiving dishes are even larger.

The consequences of large receiving antennas affect the very nature of the type of service provided via satellite. Large dishes require a concrete pad for support, large amounts of space, installation by trained technicians and complicated positioning mechanisms due to the weight of the antenna, all of which translate to high costs for the initial installation. The high installation costs directly impact sales as many consumers cannot afford these high installation costs.

While cost is a large factor, it is by no means the only disadvantage of current DTH satellite service. Many consumers dislike the aesthetics of a large satellite dish sitting in their yard. Consequently, many consumers who could otherwise afford to subscribe to current DTH service do not subscribe because they do not want to place a large parabolic dish antenna in their yard. Due to the poor aesthetics of these antennas, restrictive covenants in housing developments often prohibit home owners from erecting them.

The combination of high costs and low aesthetics of these antennas limits the appeal of DTH satellite broadcasts, which directly competes with current CATV providers, hence the growth of CATV has been comparatively explosive due to lack of effective competition. However, CATV will probably never be available to all consumers due to its high installation costs in rural areas. Furthermore, the high costs of CATV installation means that many third world countries will not get CATV for many years, if ever. Thus, there will probably always be a market for DTH satellite services.

Even if the costs and aesthetic problems were solved, large antennas are not practical. While large dish antennas may be suitable for use in some applications, they are much too large for general home consumer use, or at least for use in most homes. The problem is particularly acute in urban areas, where it would be impractical for everyone to employ such a large antenna due to space limitations. As a result, CATV enjoys a relative monopoly on television services in urban areas.

In some parts of the world, other DTH services called Direct Broadcast Services (DBS) are available. The major advantage of these systems is they transmit signals at Ku-Band frequencies, which are higher than C-Band frequencies. Higher transmitting frequency permits a smaller receiving antenna, which for Ku-Band systems is on the average about 3 feet in diameter.

While higher frequency signals permit smaller receiving antennas, even these antennas can be too large for some applications where space is at a premium. Thus, there is a need for reducing the size of television antennas, particularly at lower satellite frequencies, such as C-Band frequencies or lower.

In addition, the demand for television services from satellites has caused the Federal Communications Commission (FCC) to approve narrower spacings in the synchronous orbits, about 22,000 miles above the earth's equator. The use of $\pm 2°$ spacing allows many satellites to supply television service to the U.S. market. As more and more DTH services become available, demand will cause further reductions in satellite spacing, making the problem of interference from adjacent satellites more acute.

Previously, it was believed that C-Band satellites because of their power limitations and close spacing (about $\pm 2°$) in a synchronous satellite orbit were limited to receiving antennas at least 8 feet in diameter, and in most areas, commonly 10 feet to 15 feet in diameter. These large antennas are commonly used today, and more than 4 million such antennas are installed throughout the United States. These antennas receive television programs from up to 18 satellites. If satellite spacing reduces further, larger receiving antennas will be required to discriminate between the desired satellite and its closest neighbors.

Prior to the present invention, the only way to reduce the size of the receiving antenna for DTH systems to something below three feet in diameter was to use a higher radio frequency band, such as Ku-band (about 17 GHz), which is allocated by the FCC for direct broadcast services (DBS). In this radio band, the FCC permits higher power satellite transmissions, which translates to a reduction in the required antenna size. The higher frequency also results in a smaller width of the antenna sensitivity beam, as a result of the relationship between the width of the beam and the radio frequency. For example, a two to three foot diameter antenna operating at Ku-band frequencies, using a beam width of approximately 1.3° to 1.5°, typically can achieve an antenna sensitivity pattern that is sufficient to isolate signals from satellites that are $\pm 2°$ from the targeted satellite.

The move to higher frequency, however, comes at the cost of a need for even higher transmission power due to rain absorption at these higher frequencies. Rain has two effects on radio waves passing through it. Rain scatters the energy so that less of the energy reaches the receiver, and rain radiates thermal energy that reaches the receiver, thus increasing the random noise that interferes with the received signals. The amount of absorption and increased thermal noise from scattering is more severe for radio signals at higher radio frequencies and therefore with shorter wavelengths. The overall effect of rain loss depends on the level of rain expected and the reliability required for the service. For typical reliability levels of DTH service, at Ku-Band frequencies, one must increase the radiated power by a factor of ten to allocate for rain loss. About one third of the increase is due to increased noise and two thirds is due to rain absorption. For lower level frequency bands, such as C-Band, the corresponding allocation of power increase for the same level of reliability amounts to only about 30%.

By increasing the satellite transmission frequency to Ku-Band, higher power can be transmitted from the satellite, and a smaller antenna will achieve the required isolation for a ±2° satellite spacing. For example, a three foot antenna operating at Ku-Band has a beam width of approximately 1.8°. However, Ku-Band also requires a tenfold increase (1,000%) in transmitted power to overcome losses due to rain. At C-Band an increase of only 30% is typically needed for rain loss. Thus, merely moving to a higher frequency does not necessarily solve all the problems with antenna size.

In addition, to implement a small receiving antenna using existing C-Band satellites would seem to violate basic limitations on power and beam isolation. The restriction on total satellite power is set by the FCC at −152 dBW/m$^2$ per 4 kHz bandwidth power flux density reaching the ground. The FCC limits vary with frequency. A higher power is permitted at Ku-Band frequencies. In fact, no limits exist for frequencies in the Ka-Band. The FCC limits are designed to protect ground microwave relay equipment from interference by satellite transmissions. Obviously, foreign governments have their own limits on radiated power. The present C-Band satellites operate with radiated power up to approximately 36 dB EIRP, which falls just below the FCC limit when reaching the ground. The normal way to achieve a ground station antenna area reduction is to increase the satellite power by an equal amount. A reduction from a nine or ten foot satellite antenna to a three foot antenna would normally require a tenfold increase in satellite power, which would significantly exceed the FCC imposed limits by approximately a factor of ten.

Reducing the antenna size and increasing the transmission power, even if permitted by the FCC, would not completely solve the problem because a small receiving antenna has a larger directional receiving range. A smaller antenna of normal design will receive the signal from the satellite of interest, but will also receive interfering signals from other satellites in the constellation, at least as currently configured in the C-Band system, for example. The received signal will thus be so distorted as to impair proper decoding and reception.

Thus, the other barrier to antenna size reduction is a corresponding increase in the beam width of the receiving antenna. Current eight foot -Band antennas have beam widths typically of 1.8°, which is sufficient to discriminate between satellites ±2° away in orbit. A normal three foot antenna has a beam width of approximately 4.9°, which is not sufficient to discriminate against satellites at ±2° from the targeted satellite.

The power and beam width limitations are the main barriers that have prevented the industry from offering television services to small antennas at C-Band, which has in turn limited the growth of the DTH industry. To offer DTH service to small C-Band antennas, both power and beam width problems must be solved simultaneously.

Thus, the present invention is directed to the problem of solving the power and beam width limitations necessary to reduce the size of the receiving antenna in a satellite communication system. The present invention is also directed to the problem of developing a satellite communication system that permits the use of a relatively small receiving antenna, yet operates within the current FCC power limitations and with existing satellite configurations, which system will operate in at least C-, Ku-, S-, L- and Ka-Bands. The present invention is also directed to the problem of developing a terrestrial antenna for use in the above communication system that is relatively small, yet permits reception from existing satellite communication systems, without requiring a change in the FCC satellite transmission power limitations or a change in orbital locations of the satellites. Finally, the present invention is directed to developing the components for use in the above mentioned communication systems.

SUMMARY OF THE INVENTION

The present invention solves these problems by using a combination of: (1) aperture synthesis to create nulls in the antenna pattern that correspond to orbit locations from which potential interference is expected; (2) spectral shaping techniques to reduce transmission power flux density and interference; and (3) video compression techniques to reduce the power necessary to transmit video information. As used herein the term nulls refers also to minima in the antenna pattern, i.e., places where the antenna pattern achieves minimum values. The combination of these three techniques permits the use of an antenna with a receiving area equal to that of a three foot antenna at C-Band frequencies, and antennas with receiving areas that are significantly smaller than what is currently available for Ku-, S-, L- and Ka-Band frequencies, as well as other frequency bands.

In fact, the present invention permits a reduction in receiving antenna area, from what is currently available, for any signal being transmitted from a satellite within a constellation of satellites, particularly where a reduction in receiving antenna area would cause the receiving antenna to be unable to discriminate between satellites in the constellation. Furthermore, the present invention allows a receiving antenna to discriminate between a desired signal and potential noise sources, where the desired signal and potential noise sources have predetermined physical locations with respect to each other.

The exact implementation of the aperture synthesis technique varies slightly in the different frequency band systems, whereas the video compression technique and spectral shaping technique remain generally the same. Each technique will be separately described, and then also set forth in an embodiment for a particular application, such as C-, Ku-, Ka-, L- and S-Band.

Video Compression

The same video compression technique applies to all systems described herein, since the video compression used allows a reduction in transmission power by a factor of ten, regardless of the transmission frequency by reducing the required data rate by the same factor. While the video compression technique used in the present invention by itself does not form part of the present invention, its use in combination with the aperture synthesis and spectral shaping, as well as the components that result from such a use, are novel. The present invention employs a commercially available video data compressor available from Scientific Atlanta. The compression technique required for the present invention need not be this precise product, but may be any technique that achieves at least the same reduction in data rate. Obviously, as compression techniques improve, further reductions in transmission power will be possible, thus further enabling a corresponding reduction in the size of the antenna, or a reduction in the radiated power, or perhaps an increase in the number of transmitted channels.

Spectral Shaping

Another component of the present invention that allows rapid implementation of small antenna service is the deliberate choice of spectrally inefficient modulation. The data rate of digitally compressed video is three to five megabits per second (3–5 MBPS). This data rate could easily be transmitted in a radio frequency bandwidth of 5 MHz or less, using an efficient modulation choice, such as Quadrature Phase Shift Keying (QPSK) or Quadrature Amplitude Modulation (QAM). However, use of QPSK or QAM would for some C-Band satellites violate the power flux density limitations set by the FCC, due to the high spectral density of these modulation schemes. In addition, the use of QPSK or QAM could also possibly upset coordination between satellites now used by the industry to avoid inter satellite interference.

The present invention uses a Shaped Frequency Shift Key (SFSK) modulation scheme to keep the energy of the transponder spread smoothly over the bandwidth of the satellite transponder, e.g., spread over the 30 MHz for current C-Band satellite transponders. By spreading the bandwidth from 5 MHz to 30 MHz using the SFSK modulation technique, the power density lies below the FCC limits. The spectrum, if anything, is smoother than the spectra in the present satellites and thus will cause less interference to users of other transponders in nearby satellites. By using SFSK modulation, in combination with video compression, the radiated power of the communication system of the present invention meets the FCC power flux density limitations. Yet, the present invention also permits a quick and simple transition from current service using existing transponders to the system of the present invention without any increase in interference to other users and without requiring new satellite launches.

By choosing the optimum demodulation technique, the receivers of the present invention are also less susceptible to interference from adjacent satellites, whether the other satellites carry signals that are different than the SFSK signal of the present invention, or carry the same signal as the SFSK signal of the present invention. The SFSK signals themselves have a "coding gain" (or protection) approximately equal to the transponder bandwidth divided by the data rate. This amounts to a protection factor of between three and ten depending on the number of television signals of the present invention in one satellite transponder.

For example, where the data rate is between 3–5 MBPS and the available bandwidth is 30 MHz, the gain becomes:

$$G = \frac{B(\text{Hz})}{r(\text{bits per sec})} = \frac{30 \text{ MHz}}{3 \text{ MBPS}} = 10 \quad (1)$$

$$G = \frac{B(\text{Hz})}{r(\text{bits per sec})} = \frac{30 \text{ MHz}}{5 \text{ MBPS}} = 6$$

This coding gain is not spread spectrum gain but is more related to earlier frequency coordination techniques. It is basically determined by Shannon's Law, which relates the data rate, r, to the bandwidth of the modulated signal, B, by the relationship:

$$\frac{r}{B} \leq \log_2\left(\frac{C}{N} - 1\right) \quad (2)$$

where C/N is the ration of carrier power to noise power needed to receive the signal. By itself, the use of SFSK modulation is not sufficient to protect against adjacent satellite interference, but is does form part of the overall protection of the present invention by reducing the requirements of the depth of the antenna sensitivity nulls and pointing accuracy required of a small antenna Three different SFSK modulation shapes are available, depending on whether the transponder of the present invention uses one, two or three channels, which depends on the radiated power available in the transponder. A transponder radiating 30–31 dB EIRP can transmit one television channel using one particular SFSK shape; a transponder radiating 31–33 dB EIRP can transmit two channels using a different SFSK shape; and a transponder radiating 35 dB or more EIRP can transmit three channels using a third shape, which is different than the other two. The choice of specific SFSK shape ensures that the present invention is non-interfering with present satellite users and non-interfering with itself.

While SFSK modulation is known, and does not by itself form part of the present invention, the combination of SFSK modulation, video compression and aperture synthesis is novel.

The adjustment of data rate with EIRP, while keeping the bandwidth constant and yet automatically accounting for the reduction in transmitted power by providing additional protection through the choice of SFSK modulation is also novel. Decreasing the radiated power for the same bandwidth, while simultaneously decreasing the data rate, effectively increases the "coding gain". Thus, the present invention automatically provides additional protection from interfering signals. The result is that maximum channel capacity is achieved with a given size antenna but unequal satellite EIRP's. For example, an interfering satellite with 35 dB of radiated power would be three times more interfering to a satellite with a 30 dB EIRP, but the coding gain of the receiver for the 30 dB satellite would have three times the coding gain to compensate.

Aperture Synthesis

The present invention employs an aperture synthesis technique to permit a small antenna to discriminate between a satellite within a constellation of satellites, despite the fact that its beam width is wider than the spacing of the satellites in the constellation. Aperture synthesis refers to shaping the antenna not in a circle but in an irregular shape that puts nulls in the antenna pattern that correspond to precisely the orbit locations from which interfering signals are expected to originate.

The aperture synthesis technique of the present invention places gaps in the antenna surface to cause signals from satellites other than the targeted satellite to cancel themselves out, while enhancing the non-interfering signals. The exact design of the antenna will differ for each frequency band for which it is implemented, however, the basic concept remains the same. By matching the gaps in the receiving antenna to the point at which the signals from adjacent satellites will impinge upon the receiving antenna, such that the interfering signals will cancel themselves out, the antenna effectively places notches in its beam width where interfering satellites are located.

The use of aperture synthesis to create nulls in the receiving antenna such that the antenna cancels out interfering signals from adjacent satellites is novel and forms part of the present invention. Additional details of this aperture synthesis technique will be described below.

C-Band Satellite Communication System and Antenna

The C-Band satellite communication system of the present invention only requires an antenna having an area equivalent to that of a three foot or less diameter parabolic dish to adequately receive the signal from existing C-Band satellites in their current configuration, yet stays within the FCC power limits of radiated power from the satellite that reaches the ground. To meet the power limitation of approximately 36 dB EIRP at C-Band frequencies (3.9–6.2 GHz) in a relatively small receiving antenna, the present invention employs a combination the above video compression and spectral shaping techniques. By compressing the data, the required received power is reduced by a factor of ten. Thus, within the same power limitation on radiated power from the satellite of $-152$ dBW/m$^2$ in a 4 kHz bandwidth, an antenna with one tenth the area can be used.

The C-Band satellite communication system includes a small receiving antenna to receive conventional C-Band satellite transmissions. Due to the combined use of the above three features, however, the antenna of the present invention can have an area on the order of that of a three foot diameter dish, which is much smaller than any C-Band satellite antenna known to be in use today for receiving television.

By reducing the antenna diameter, the beam width is normally increased. Reducing the diameter from 8 feet to 3 feet increases the beam width from $1.8°$ to $4.9°$. The result is that the smaller antenna can normally no longer discriminate between adjacent C-Band satellites in their current orbital configuration.

The present invention solves the beam width problem by designing the receiving antenna with nulls in its antenna pattern that correspond to those orbital locations in which potentially interfering satellites are located. The nulls are specific to C-Band frequencies and are located in orbit directions $\pm 220$ to $\pm 4°$ from beam center, where adjacent satellites are located.

To create the desired nulls, the present invention employs the above mentioned aperture synthesis technique, i.e., shaping the antenna not in a circle but in an irregular shape that puts nulls in its antenna pattern that correspond to precisely those orbit locations where interfering signals are expected to originate. Nulls in the specific locations unique to the satellite spacing at C-Band address the specific problem of the C-Band television industry in a way that allows a breakthrough in service offerings. Nevertheless, the present invention is not limited to C-Band implementations, but serves to significantly reduce the antenna size for any satellite frequency and satellite spacing.

The third component of the present invention that allows a rapid implementation of DTH service to small antennas is the deliberate choice of the spectrally inefficient modulation technique discussed above. The present invention uses an SFSK modulation scheme to keep the energy of the transponder spread smoothly over the bandwidth (about 30 MHz) of the satellite transponder. By using the SFSK modulation, the present invention meets the FCC power flux density limitations and allows implementation of the present invention in existing transponders without any increase in interference to other C-Band users. Thus, switching from current DTH service to the new service of the present invention can be easily accomplished. By choosing the optimum demodulation technique, the receivers of the present invention are also less susceptible to interference from adjacent satellites, whether the other satellites carry normal C-Band traffic or the signal of the present invention. By choosing the data rate and number of television channels to vary with each satellite's power level, the interference is equalized between satellites and the number of channels is optimized for a given antenna area on the ground.

Although the SFSK signals themselves have a coding gain, which is approximately equal to the transponder bandwidth divided by the data rate, by itself, SFSK gain is not sufficient to protect against adjacent satellites at $\pm 2°$ spacing. It does, however, form part of the overall protection of the present invention by reducing the requirements of the depth of the antenna sensitivity nulls and pointing accuracy required of the small antenna.

The combination of reduced data rate due to the video compression and the coding gain provided by the SFSK modulation reduces the depth of the antenna nulls required to achieve a significant reduction in antenna size. Nevertheless, sizable nulls are still required. At least 10 dB nulls in the direction of each interfering satellite are required to achieve the necessary isolation of the desired signal from the interfering satellite signals. The aperture synthesis technique described herein accomplishes the required 10 dB nulls in the direction of each interfering satellite.

The unique combination of digital television compression to reduce the overall power requirements, antenna beam synthesis to notch out satellite interference from adjacent satellites in the constellation, for example, from $\pm 2°$ and $\pm 4°$ positions in synchronous orbit in the present C-Band configuration, and SFSK modulation to reduce intersystem interference, allows significant improvements in satellite television DTH service, especially in C-Band. The present invention allows television programs to be offered to small-aperture user antennas without any change in the existing C-Band satellites. It allows the equivalent of direct broadcast satellite service (DBS) to be offered without any launch of new satellites. The current satellites can be switched from current service to the system of the present invention one transponder at a time, as C-Band DTH users develop without interrupting existing service. This smooth transition without requiring any new satellite launches provides a major economic advantage to the system of the present invention. In fact, the cost and delay inherent in any satellite launch forecloses implementing many other DBS system designs. By permitting a quick transition from previous service to the service of the present invention, without the huge cost of a satellite launch, the system of the present invention can be rapidly implemented in the marketplace. Furthermore, the C-Band system of the present invention maintains a permanent advantage of reduced rain loss, giving a tenfold reduction in satellite transponder power required and a continuous major cost advantage to the C-Band system of the present invention in competition with Ku-Band DBS existing service.

The combination of these three techniques allows a C-Band antenna design having an area equivalent to that of a three foot diameter dish, as compared to existing C-Band antennas which vary between 8 and 10 feet in diameter. Due to the small size, the C-Band system of the present invention does not require an installation professional to install the antenna or a concrete pad to support it. Finally, the aesthetics of the antenna are improved by allowing the user to locate the antenna in a convenient location wherever the antenna has an unobstructed line of sight to the satellite, such as the roof, a window, etc. Thus, the present invention reduces initial investment costs for consumers and improves aesthetics, which permits a DTH system that can effectively compete with existing CATV systems in urban areas yet also accommodates users in rural areas where CATV is not feasible. Thus, the present system combines the advantages of DTH systems, i.e., accessibility to rural users, with the advantages of CATV systems, relatively low cost installation for urban areas. In fact, the system of the present invention costs less to install than a CATV system, if the satellites are already in existence.

Ku-Band Satellite Communication System and Antenna

The same general technique is possible for a Ku-Band satellite communication system and antenna. Generally, the problem is similar to the problem in the C-Band system. Ku-Band frequencies (15.35–17.25 GHz) are used for direct broadcast television. Due to the frequencies involved some differences exist in the orbital spacing of the satellites and the allowable FCC power limitations. The FCC power limits are higher at Ku-Band than C-Band, however, losses due to rain absorption and thermal noise are higher at Ku-Band frequencies. Therefore, to use a smaller antenna at Ku-Band than what is in current use (about two to five feet in diameter) normally would require higher radiated power. This is not possible due to the FCC limitations. However, equivalent size savings on Ku-Band antennas are possible with the combination of the video compression, spectral shaping and antenna design techniques discussed above, when tailored for the Ku-Band environment.

Essentially for the same constellation of satellites discussed above, spaced at ±2° intervals, the antenna dimensions reduce by the ratio of the respective wavelengths. The gaps in the antenna remain in the same proportional locations as for the C-Band system. For example, to modify the antenna from C-Band to Ku-Band, the scaling ratio becomes:

$$\frac{\lambda_C}{\lambda_{Ku}} = \frac{f_{Ku}}{f_C} = \frac{16.3 \text{ GHz}}{5.05 \text{ GHz}} = 3.23 \tag{3}$$

Thus, the Ku-Band antenna can be scaled down directly from the C-Band version by a factor of about 3.23. Since the C-Band antenna has an area approximately equivalent to a three foot diameter dish, the K-Band antenna has an area approximately equivalent to a one foot diameter dish or less, with gaps in the same proportions as the C-Band system. For example, let "x" denote the position from the center of the antenna where the gaps are located, then x/3.23 denotes the placement of the gaps in the Ku-Band version of the antenna of the present invention. Current Ku-Band parabolic dish antennas are about 3 feet in diameter, hence the present invention permits a significant reduction in antennas for this frequency band as well.

L-, S- and Ka-Band Communication Systems and Antennas

The same technique is also possible to reduce the receiving antenna size for other frequency bands, such as L-Band (0.390–1.550 GHz), S-Band (1.55–5.20 GHz) and Ka-Band (33–36 GHz). To reduce the antenna size requires a reduction in the amount of data per unit bandwidth, which is solved by data compression techniques. Where television signals are involved, video data compression techniques permit a significant reduction in data, approximately 90% (i.e., the compressed digital signals are about $\frac{1}{10}$ the information rate of the uncompressed signals). This by itself is not sufficient to significantly decrease the antenna size with existing satellite configurations. When combined with a modulation technique that reduces the power flux density, provides some gain, and allows an increase in the transmission power, the receiving antenna can be significantly reduced in size.

The receiving antenna must also be designed according to the present invention to permit the receiving antenna to operate in the transmission footprint of multiple satellites in the constellation, yet still discriminate between the satellite of interest and those adjacent to the satellite of interest. The same technique described herein will work in the S-, L- and Ka-bands. The only special considerations for operating at S-, L- and Ka- bands are the shaping of the antenna to achieve the required nulls in the antenna patterns, the specific spacing between satellites in orbit and the satellite power required including the effect of compression and also rain absorption. A unique combination of beam shape, antenna shape, modulation shape and the number of television channels per transponder is appropriate for each band following the procedure illustrated by the basic C-Band system description.

As before, for the same constellation of satellites discussed above, spaced at ±2° intervals, the antenna dimensions are reduced by the ratio of the respective wavelengths. The gaps in the antenna remain in the same proportional locations as for the C-Band system. For example, to modify the antenna from C-Band to L-Band, the scaling ratio becomes:

$$\frac{\lambda_C}{\lambda_L} = \frac{f_L}{f_C} = \frac{0.97 \text{ GHz}}{5.05 \text{ GHz}} = \frac{1}{5.2} \tag{4}$$

Thus, the L-Band antenna can be scaled up directly from the C-Band version by a factor of about 5.2. Since the C-Band antenna has an area approximately equivalent to a three foot diameter dish, the L-Band antenna has an area approximately equivalent to a 15.6 foot diameter dish, with gaps in the same proportions as the C-Band system. For example, let "x" denote the position from the center of the antenna where the gaps are located, then 5.2x denotes the placement of the gaps in the L-Band version of the antenna of the present invention. Existing L-Band parabolic dish antennas are approximately three times in diameter, hence the present invention permits a significant reduction in the receiving antenna for L-Band implementations as well.

For example, to modify the antenna from C-Band to S-Band, the scaling ratio becomes:

$$\frac{\lambda_C}{\lambda_S} = \frac{f_S}{f_C} = \frac{3.375 \text{ GHz}}{5.05 \text{ GHz}} = \frac{1}{1.5} \tag{5}$$

Thus, the S-Band antenna can be scaled up directly from the C-Band version by a factor of about 1.5. As a result, since the C-Band antenna has an area approximately equivalent to a three foot diameter dish, the S-Band antenna has an area approximately equivalent to a 4.5 foot diameter dish, with gaps in the same proportions as the C-Band system. For example, let "x" denote the position from the center of the antenna where the gaps are located, then 1.5x denotes the placement of the gaps in the S-Band version of the antenna of the present invention. Existing S-Band parabolic dish antennas are approximately three times in diameter, hence the present invention permits a significant reduction in the receiving antenna for S-Band implementations as well.

For example, to modify the antenna from C-Band to Ka-Band, the scaling ratio becomes:

$$\frac{\lambda_C}{\lambda_{Ka}} = \frac{f_{Ka}}{f_C} = \frac{34.5 \text{ GHz}}{5.05 \text{ GHz}} = 6.8 \qquad (6)$$

Thus, the Ka-Band antenna can be scaled down directly from the C-Band version by a factor of about 6.8. As a result, since the C-Band antenna has an area approximately equivalent to a three foot diameter dish, the Ka-Band antenna has an area approximately equivalent to a 0.44 foot diameter dish, with gaps in the same proportions as the C-Band system. For example, let "x" denote the position from the center of the antenna where the gaps are located, then x/6.8 denotes the placement of the gaps in the Ka-Band version of the antenna of the present invention. Existing Ka-Band parabolic dish antennas are approximately three times in diameter, hence the present invention permits a significant reduction in the receiving antenna for Ka-Band implementations as well.

In using the design technique of the present invention, if the area is more or less than that desired, if for example, due to satellite power limitations or rain losses, then the gaps in the East-West dimensions can be kept as before, but the widths in the North-South dimensions can be scaled to achieve the desired area. For example, the North-South dimensions could be doubled to achieve twice the area without changing the locations of the antenna nulls in the East-West orbit positions.

DETAILED DESCRIPTION

Description of the Antenna for the C-Band System

Figure 1:
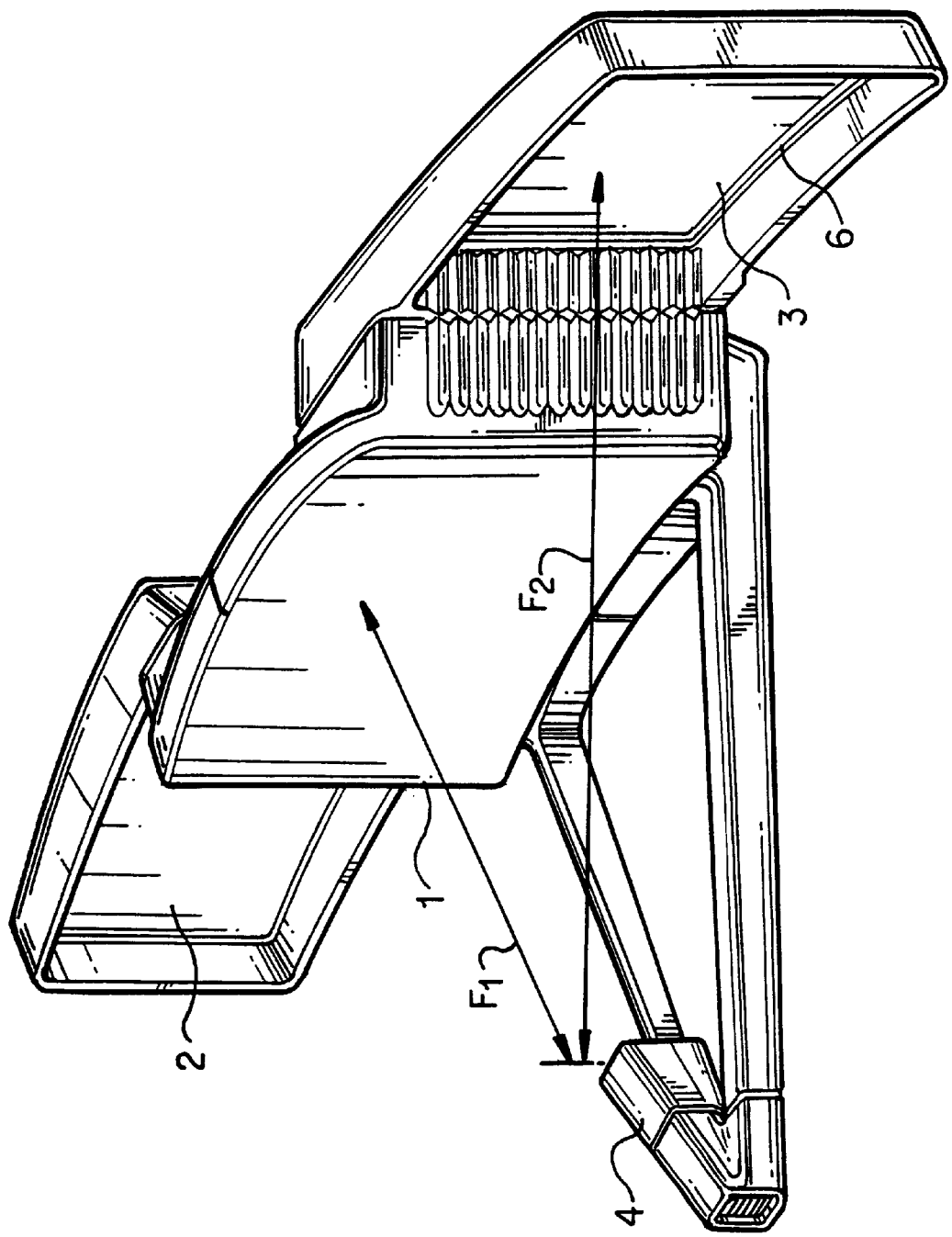
FIG. 1 depicts an embodiment of the antenna of the present invention for use in a C-Band satellite communication system operating according to the method of the present invention.

FIG. 1 depicts an embodiment of the receiving antenna of the present invention for use in the C-Band satellite communication system. As evident in FIG. 1, the antenna comprises a main reflector 1, and two side reflectors 2 and 3, as well as an antenna feed 4. The main reflector 1 and both side reflectors 2 and 3 have parabolic surfaces. The radius of the embodiment of the antenna shown in FIG. 1 from the feed 4 to the main reflector surface 1 is $F_1$, which is about 20.0 inches. The radius from the feed 4 to the side reflectors is $F_2$, which is about 28.8 inches. The antenna has a fresnel step equal to $F_1-F_2$, i.e., about 8.8 inches. The length of the antenna from the outside edge of one side reflector 2 to the other 3 is 57.5 inches. The width or horizontal dimension of the side reflectors, 2 and 3, is 19.2 inches, and the width or horizontal dimension of the main reflector is 13.3 inches. The vertical dimension of the main reflector is about 10.55 inches, while the vertical dimension of the side reflectors is about 5.48 inches.

The antenna of the present invention uses a spill over baffle to prevent thermal energy from the ground behind the antenna from reaching the feedhorn. As seen in FIG. 1, the spill over baffle 6 is located in the outer edge of the outer reflectors.

The aperture synthesis for the C-Band antenna of the present invention is designed to provide normal gain for a satellite at one position in the synchronous orbit and provide low-gain nulls for satellites at ±2°, ±4°, ±6° and ±8° away in synchronous orbit. The depth of the nulls can vary, but must be at least 10 dB to prevent interference. Thus, the antenna is designed to receive from only one of the satellites in a constellation at a time, while simultaneously inhibiting reception from the remaining satellites in the constellation, especially those directly adjacent to the targeted satellite. The reason for inhibiting reception from these satellites is that they are the single largest source of potential interference since they are transmitting at nearly the same radio frequencies, but the signals contain different programs than the signal from the targeted satellite. These interfering signals will seriously distort the received signal, and prevent proper decoding unless they are suppressed by the antenna pattern.

Figure 2:
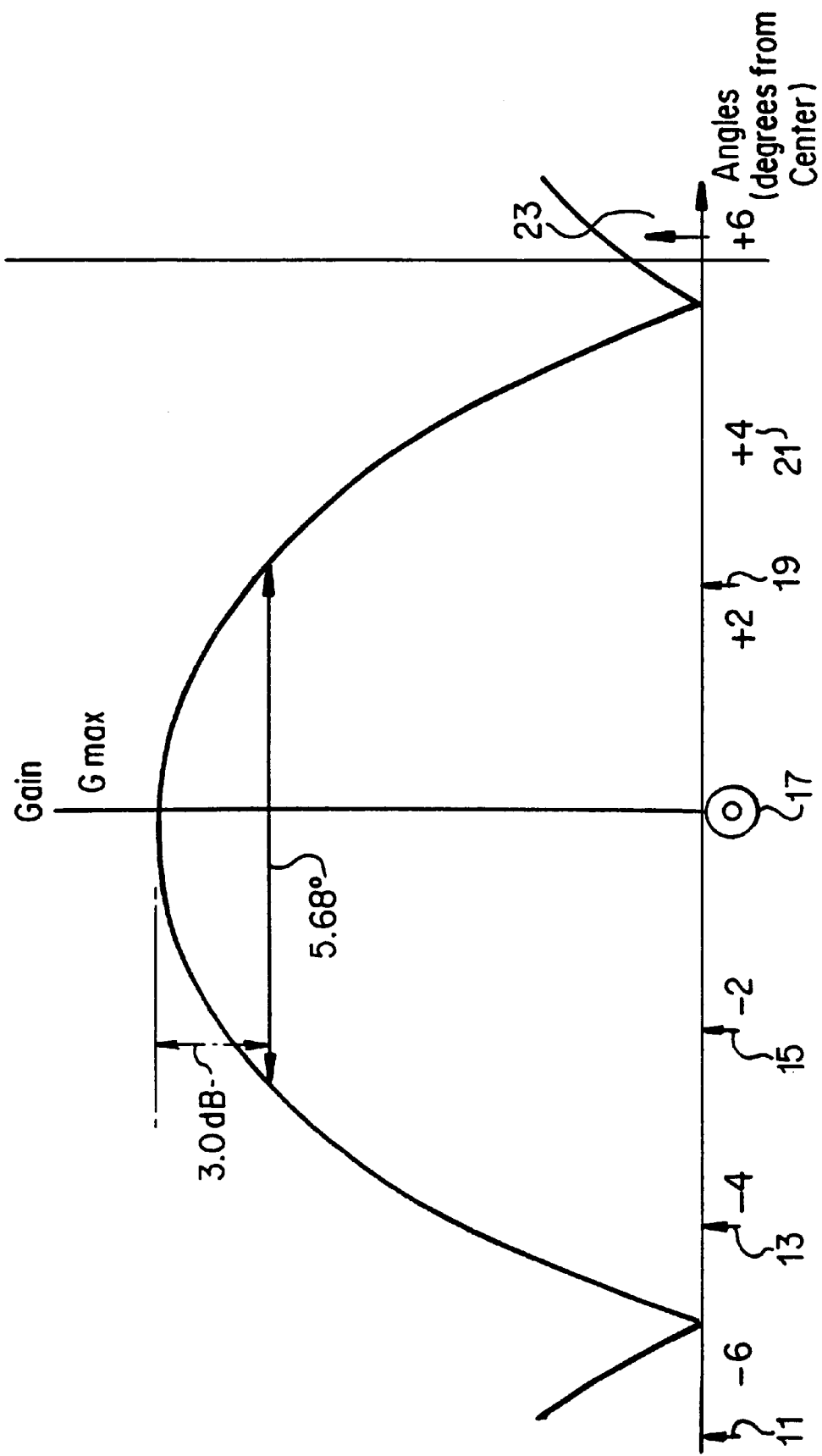
FIG. 2 depicts a typical antenna pattern of a normal three foot dish antenna receiving signals from the current constellation of television broadcast satellites operating in the C-Band range.

In the C-Band version of the present invention, the actual position of the required nulls are in fact a little wider than the ±2° spacing because the antenna on the surface of the earth is closer to the constellation of satellites than the earth's center, as evident in FIG. 2. FIG. 2 depicts the typical antenna pattern of a three foot receiving antenna receiving signals from the current constellation of television broadcast satellites operating in the C-Band range. The arrows in the figure represent interfering satellites 11, 13, 15, 19, 21 and 23. The target satellite 17 is centered at the maximum gain of the receiving antenna.

The 3 db cutoff frequency of the receiving antenna is about 5.68° from center. A diameter of 36" equals about 91 centimeters. The wavelength λ of a representative signal in the C-Band, i.e., about 4 GHz, is determined by:

$$\lambda = \frac{C}{f} = \frac{3 \times 10^8 \text{ meters/sec}}{4 \times 10^9 \text{ sec}^{-1}} = 0.075 \text{ meters} \quad (7)$$

The three-dB cutoff angle, a, is determined typically by the following formula. Thus, at 4 GHz a becomes:

$$\alpha \approx \frac{69\lambda}{D} = \frac{69 \times 0.075 \text{ meters}}{0.91 \text{ meters}} = 5.69° \quad (8)$$

The difference from the ±2° spacing varies from a maximum of ±2.35°, when the satellites are above the same longitude as the ground antenna, to ±2.11° when the satellites are 60° east or west of that position. These variances can be accounted for by designing the gaps to be at the mean of these values, and providing sufficient depth in the null to account for when the receiving antenna is at the extremes.

Figure 3:
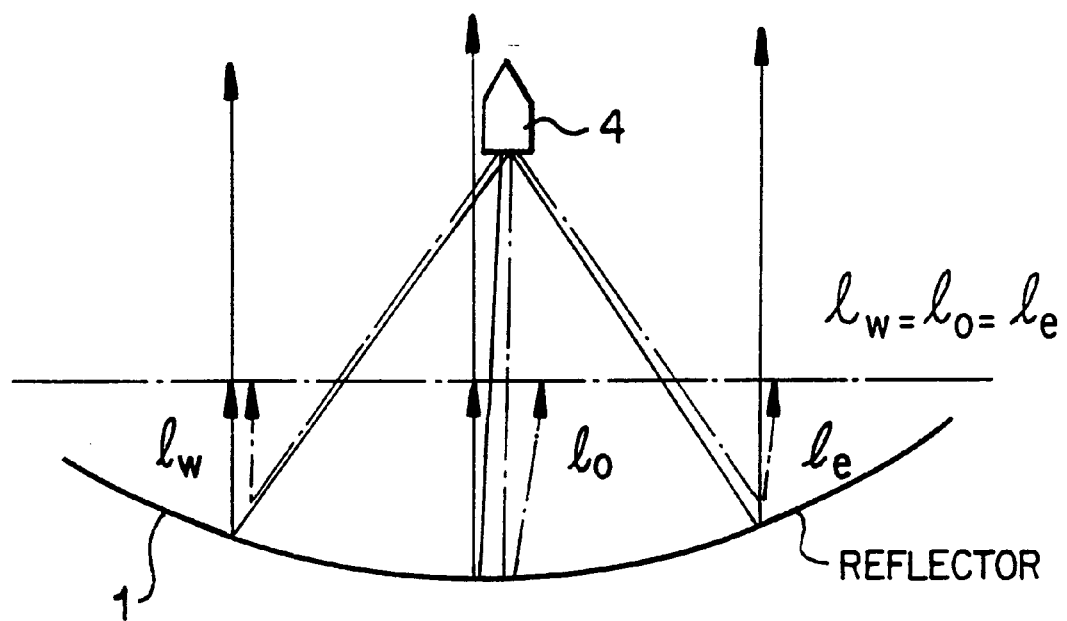
FIG. 3 depicts the distance travelled by all rays from the feed-horn to the reflector to the target satellite, when the direction to the target satellite lies along the main axis of a parabolic antenna.

In analyzing the antenna performance, it is most useful to treat the problem as a ray tracing problem. The antenna gain can be found by tracing rays from the antenna feed horn 4, or central power collector, to the surface of the reflector 1 and from there out to the far distance, or "infinity" in a particular direction. When the direction lies along the main axis of a parabolic antenna, the distance traveled by all rays from feed-horn to reflector to the distant point is the same, as shown in FIG. 3. All increments of power traveling those paths will arrive with the same delay, since $l_w = l_o = l_c$. Therefore, the field in that direction will receive all increments of energy in phase with each other reinforcing each other for maximum gain.

Figure 4:
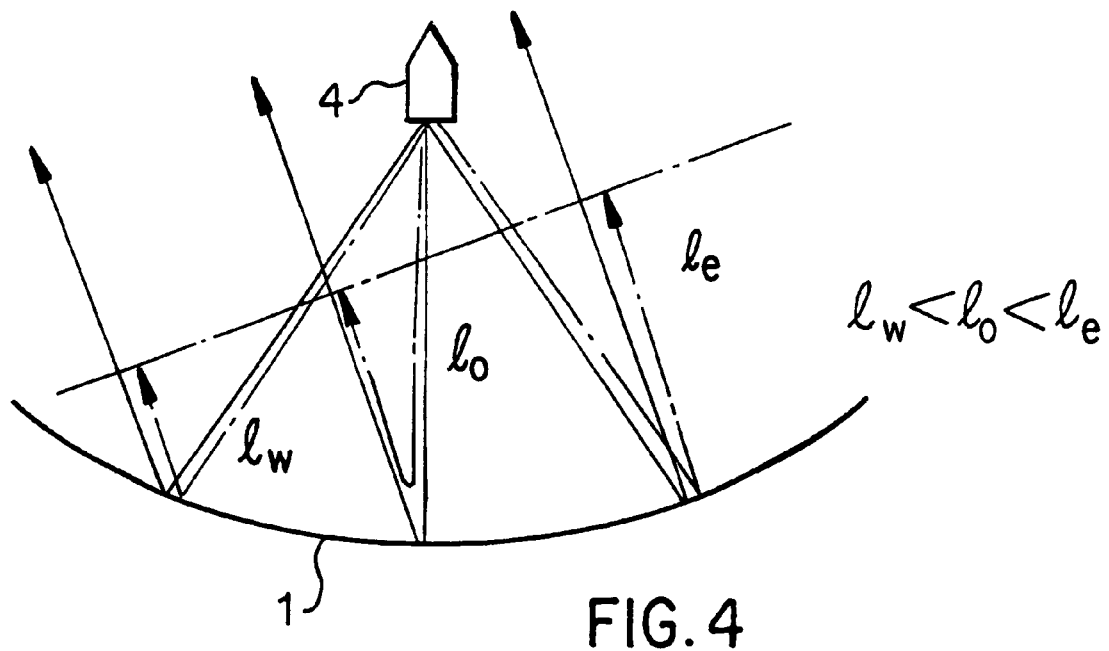
FIG. 4 depicts the distance travelled by all rays from the feed-horn to the reflector to the target satellite, when the direction to the target satellite lies is not along the main axis of a parabolic antenna, but rather lies along a path offset from the main axis.

Conversely, for a direction some degrees off the main axis (as shown in FIG. 4), the energy reflected from different parts of the parabolic reflector 1 travel paths of different lengths. Energy from the reflector side $l_w$ that is closer to the direction of the main axis (the near side) travels a shorter path than energy from the center of the reflector, $l_o$, hence $l_w < l_o < l_c$. As a result, the energy from the near side arrives earlier in phase than the energy from the center; and the energy from the far side arrives later in phase than the energy from the center. When energy from all of the reflector is combined at the distance, some increments add and some subtract from the whole. In aggregate, the sum totals less than the sum of the energy in the main axis of the antenna. When the distance difference from the center of reflector to the edge of reflector reaches one half of the radio frequency wavelength, λ, the energy from the edges directly subtracts from the energy from the center. The diameter of the antenna at this point is given by the relationship:

$$\frac{D}{2}\sin\phi_{1/2} = \frac{\lambda}{2} \text{ where } \lambda = \frac{C}{f} \quad (9)$$

With a normal reflector feed design, at an angle twice $\phi_{1/2}$, energy from the edges is delayed by one whole wave length and is back in phase with energy from the center. This will cause the energy at $2 \times \phi_{1/2}$ to be reinforced again causing a minor peak in the antenna pattern.

The values where the actual nulls in the patterns and the subpeaks occur depend precisely on the shape of the feed horn pattern illuminating the reflector, the shape of the reflector and the blockage of any energy by structures, such as the feed horn and its supports. For a typical antenna design, the diameter required to reduce the gain to reasonable protection levels for ±2° satellite spacing at C-Band, f=4 GHz., λ=0.075 m, is about 8.5 feet. In the antenna of the present invention, even though digital television compression and spectral shaping would allow an antenna as small as 3 feet in diameter, the interference of satellites at ±2.24°, ±4.48°, etc. preclude the standard small dish.

The present invention solves this problem by using sections of parabolas with areas blocked out to control the phases of energy reaching the directions at ±2.24°, ±4.48°, etc. in such a way as to cause nulls, or large attenuations, at precisely these positions in the satellite orbit. The basic parabola is pointed at the desired satellite of interest (referred to as the targeted satellite) and all field components in directions towards the interfering satellites add up with different phase angles to cause the precise cancellations.

FIG. 1 depicts one embodiment of the present invention. The top view of the antenna shows that three sections of the normal parabolic surface have been retained, a central section and two side sections in the east-west directions parallel with the earth's equator. The section widths in the north-south direction can be adjusted to increase or decrease the amount of energy in any east-west location. For example, the outer contour of the antenna may have an irregular shape rather than a smooth curve to add and subtract area in the antenna to add or subtract the energy reaching the antenna as desired. The north-south dimension can be reduced to zero, i.e., by placing a gap between sections, to accomplish the desired nulls, or it can be widened to increase energy in desired directions.

Figure 6:
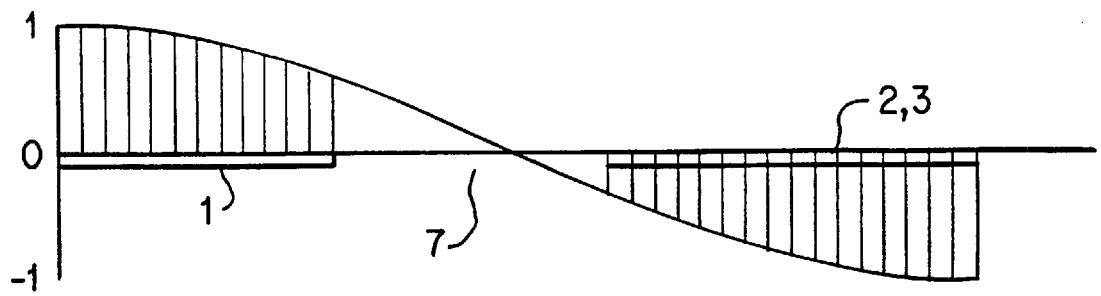
FIG. 6 shows the projection of energy arriving at one embodiment of the C-Band antenna of the present invention from the satellite 2.24° from the central satellite.

FIG. 6 shows the projection of energy arriving at the satellite 2.24° from the central satellite. The reference phase is that of energy arriving from the center of the reflecting surface. What is plotted is the cosine of the phase angle between this central energy and energy from off axis positions. As energy comes from further away from the center, the projection decreases, goes through zero and becomes negative. A gap 7 exists between the main reflector 1 and the two side reflectors, 2 and 3.

Figure 7:
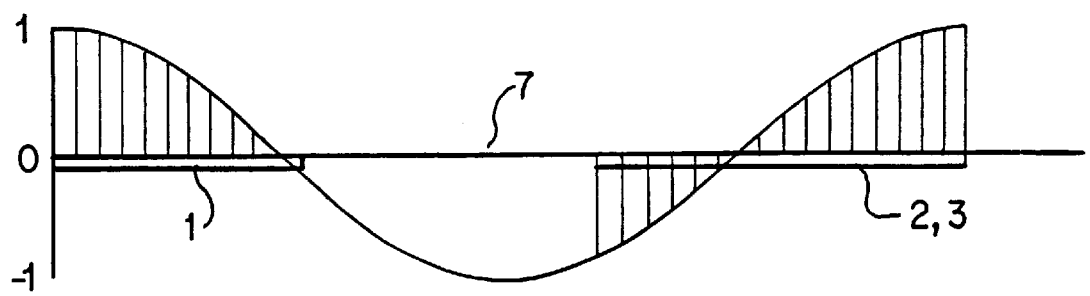
FIG. 7 shows the projection of energy arriving at one embodiment of the C-Band antenna of the present invention from the satellite 4.48° from the central satellite.

FIG. 7 shows the same projection but this time for energy arriving at ±4.48° from the central satellite. The same behavior is seen but now the zero appears twice as close to the center.

Figure 8:
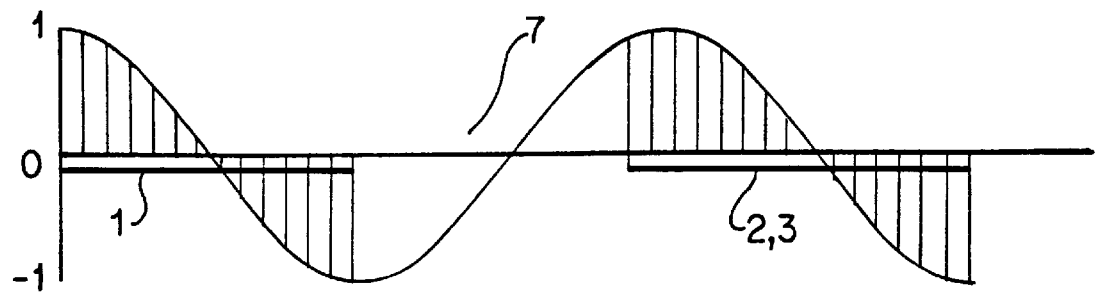
FIG. 8 shows the projection of energy arriving at one embodiment of the C-Band antenna of the present invention from the satellite 6.72° from the central satellite.

FIG. 8 shows the same for satellites at ±6.72°. Similar plots are found at ±8.96°, etc.

To find the field strength at 2.24°, the shaded area of FIG. 6 would be integrated over the reflecting surface. More precisely, the physical area of each reflector element should be further weighted by the gain of the feed horn antenna in the direction of the reflector elements.

In the example of FIG. 6, the reflecting area and gap are selected to illustrate the principle. The gap size and location have been selected to cause energy from the positive central section to cancel with negative phases for the two edge sections. This causes a null at ±2.24° off the axis from the central satellite.

In this particular example, the energy at ±4.48°, shown in FIG. 7, will not precisely cancel as can be found by integrating FIG. 7 over the aperture and gap. However, to improve on cancellation at ±4.48°, area can be added or subtracted at any point by increasing or decreasing the north-south width of the main reflector. In FIGS. 6–8 this direction is into the paper. If area is added in the region where the ±2.24° curve, FIG. 6, goes through zero, then there will be no change to the ±2.24° cancellation while the ±4.48° cancellation will be improved.

In a similar way, areas of the antennas where the ±4.48° curve goes through zero can be increased or decreased in width to refine the nulls at ±2.24° and ±6.72° without affecting the null at ±4.48°. Since only four sets of nulls need to be canceled before the pattern will remain below the required level, the problem is underconstrained, i.e., there are many different fine adjustments of the widths in the North-South dimension that can be made to cancel the signals in the ±2.24°, ±4.48°, ±6.72° and ±8.90° locations.

Because the antenna's gain beyond 8° is systematically below the required levels, the cancellation at ±2.24°, ±4.48°, ±6.72° and ±8.96° need only be balanced using the procedure of the present invention. There are many more degrees of freedom in the design than necessary to create the required eight nulls in the east-west pattern of the antenna. A number of combinations of feed horn gain, gap sizes and north-south width choices exist that create the required notches. The embodiment illustrated in the drawings utilizes apertures that are rectangular in outline as projected in the direction of the satellite, a central area that is blocked by the feedhorn, and avoidance of gaps between the main and side reflectors as seen from the feed point.

Figure 5:
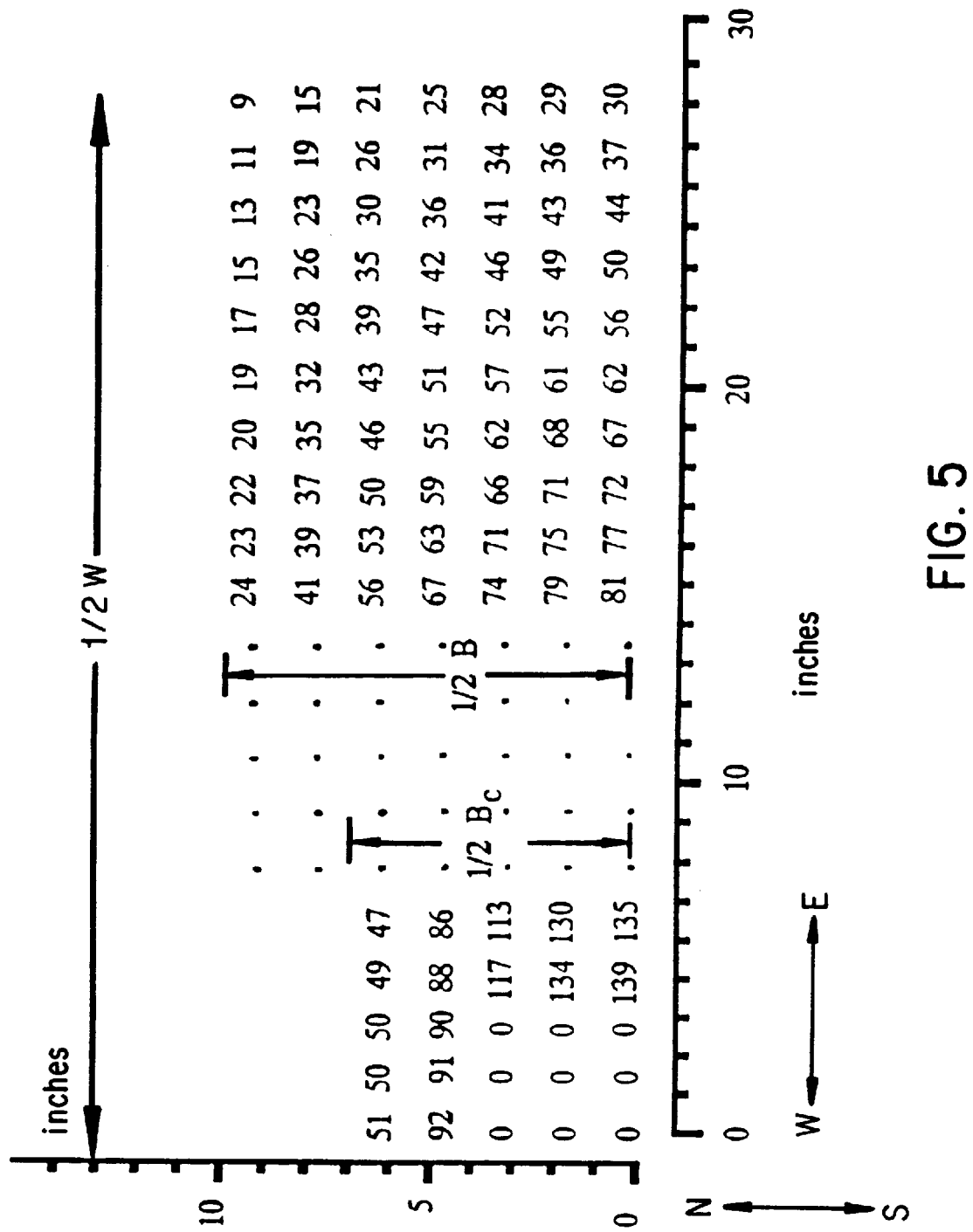
FIG. 5 depicts the signal strength of the received signal on the surface of the antenna of an embodiment of the C-Band antenna of the present invention, as seen from a top view of the antenna.
Figure 9:
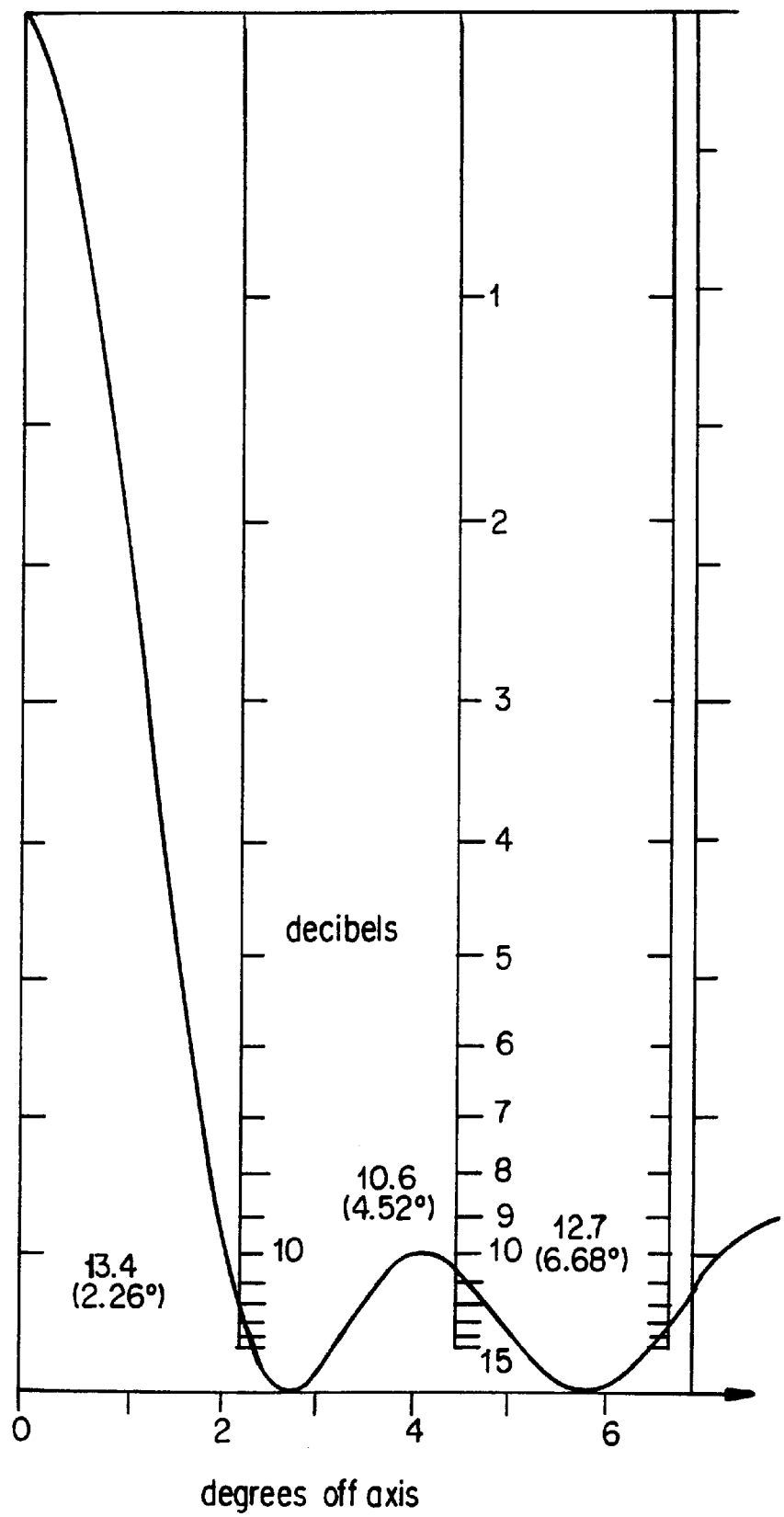
FIG. 9 depicts the received signal strength from the off axis satellites of one embodiment of the C-Band antenna of the present invention.

FIG. 5 illustrates the antenna pattern resulting from the antenna depicted in FIG. 1. The numbers in the top view in FIG. 5 represent the field strength of the feed horn on the antenna surface. The gap and north-south dimensions have been chosen to accomplish the desired cancellation. As shown in FIG. 5, the 0's in the central section represent feed horn blockage; B represents the width of the outer reflector; $B_c$ represents the width of the inner reflector; and W is the width of the antenna. Only one half of the antenna is shown. The numbers in FIG. 5 depict the signal strength on the antenna at the particular coordinates. For example, 25 mV is the electric field strength of the antenna at 28 inches in the East-West direction and about 5 inches in the North-South Direction. The dots represent places where the signal strength is effectively zero. FIG. 9 shows the gain of the antenna at the different angles showing the desired nulls in the desired positions. Thus, FIG. 9 depicts the off-axis performance of the antenna.

FIG. 1 also shows a second innovation of the antenna of the present invention. The full gap between center and side sections allows the use of what is termed a Fresnel lens improvement. As long as the antenna reflecting surface is parabolic, the gain will be achieved in the principal direction. One feed can be used with different parabolic surfaces. Near the center, parabolas with short focal length are used, near the edge parabolic surfaces with large focal lengths are used. As long as each parabola differs from a reference focal length by integer multiples of ½ wavelength, the energy in the principal beam will all add in phase as if they were from a single parabolic surface. This allows approximately the same performance with an antenna that is physically thinner. The steps between parabolas are made abruptly, causing a bit of loss from fringing effects, but also giving some mechanical strength improvements in some designs. In this embodiment, the fresnel step is $F_1-F_2$.

In the antenna of the present invention, an advantageous embodiment is made by having the central section constructed with a shorter-focal-length parabola than the end sections. This embodiment has three advantages. First, it makes the structure smaller and stronger. Second, it improves the antenna efficiency by having the gap required for cancellation take up the area that would be in shadow as seen by the feed horn. Third, it makes the feed horn pattern easier to realize, since the desired central reflector is smaller in the north-south dimension than the edge reflectors. The ideal feed would normally have a dumbbell pattern, pinched in the middle and wider at the sides. Moving the central reflector near to the feed increases the ideal beam width of the feed in the center section, making it more nearly oval and realizable with a more standard feed horn.

The feed horn shown in the embodiment of FIG. 1 is 2.25 inches in the East-West dimension and 8 inches in the North-South dimension. The feed horn pattern that results from this configuration is elliptical, which is wide in the East-West dimension and narrow in the North-South dimension. One other possible design for the feed horn would be to use a conventional rectangular pyramidal horn. A feed horn design with an elliptical mouth rather than a rectangular mouth would also suffice.

The Fresnel step between center and outside parts of the antenna thus increases the efficiency of the feed horn without compromising the actual area of the antenna of the performance at the desired null points. While the present embodiment depicts a particular fresnel step in which the focal length increases from the main reflector to the side reflectors, a number of different step options are possible in alternative embodiments.

Thus, the antenna of the present invention is designed to shape the feed pattern and the reflector area to create nulls at the interfering satellite points. The technique to do this has been described above. While one realization has been illustrated and described in detail, many variations are possible.

One specific addition to the general approach is to use different focal-length parabolas on physically separated sections. This configuration can improve the feed efficiency as well as the mechanical design.

Figure 12:
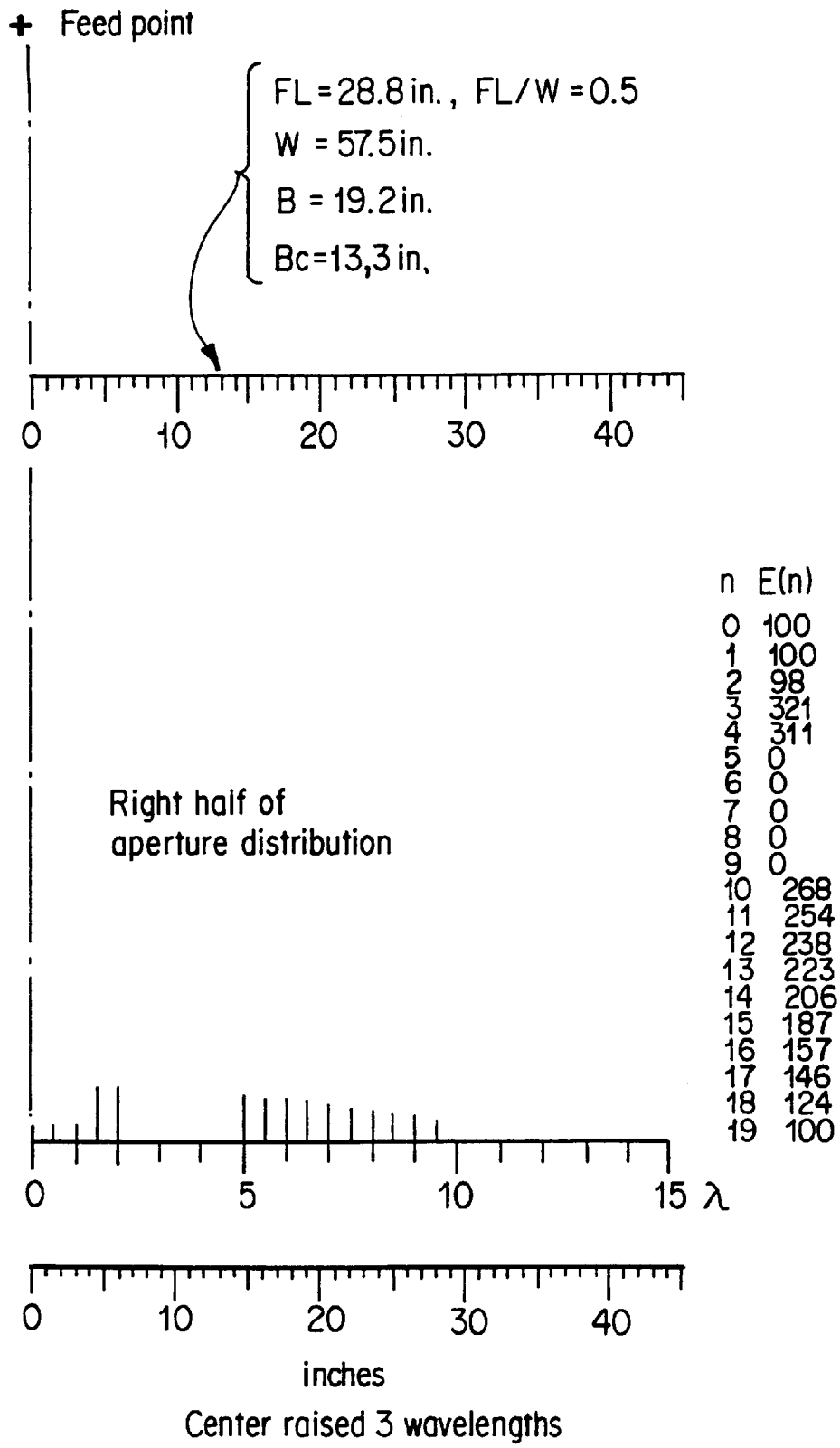
FIG. 12 depicts a cross-section of the C-Band antenna of the present invention and the corresponding received signal strength.

FIG. 12 depicts a cross-section of one half of the antenna. FL=focal length. The bottom part of FIG. 12 indicates the aperture distribution of the antenna of the present invention. E(n) represents the total signal strength of the antenna at a given East-West location for the entire North-South dimension. Thus, E(n) is the integral of the signal strength at a particular East-West location as the integral runs along a strip from one edge to the other in the North-South dimension. At 4 GHz, the center reflector is raised 3 wavelengths with respect to the outer reflector.

Figure 13:
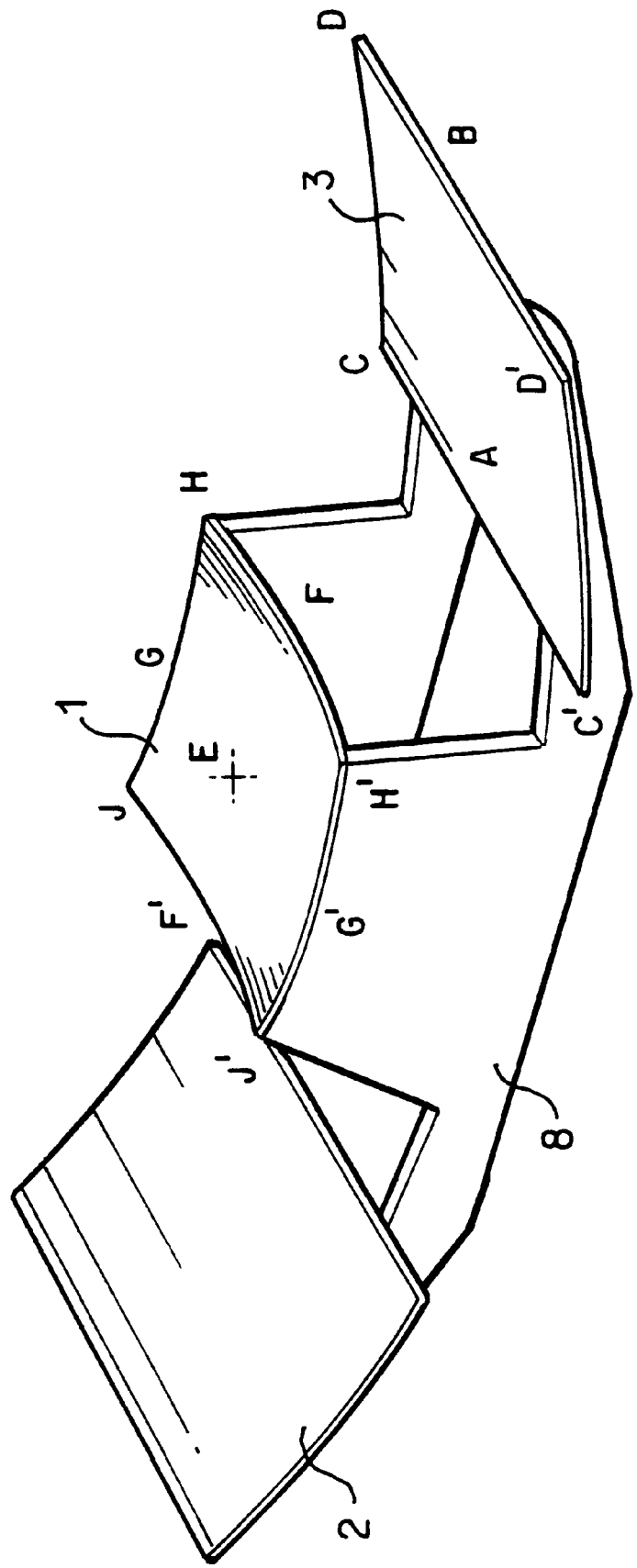
FIG. 13 depicts a general view of the C-Band antenna of the present invention.

The physical design of the antenna will be described next. The antenna consists of four parts: a central section 1, two wings 2 and 3, and a frame 8, as depicted in FIG. 13. FIG. 13 is a general view of the antenna. The shape of the frame, which is rendered schematically, may take any suitable form.

The central dish is a 13.28"×13.28" square segment of a paraboloid of focal length 19.95 inches (H-H'-J'-J in FIG. 13), centrally situated around the vertex of a paraboloid.

The height of the surface above the vertex at radial distance r in inches measured in the level plane is expressible as $r^2/79.8$. For example, at the center of each square side the height is 6.64×6.64/79.8=0.553 inches above the vertex. At the corners the height is 1.106 inches.

Table I gives the surface heights above a grid of points spaced one inch in both directions in the level plane. Only one quarter of the square is tabulated. The remaining parts of the square can be determined from the symmetry of the antenna.

Figure 14A:
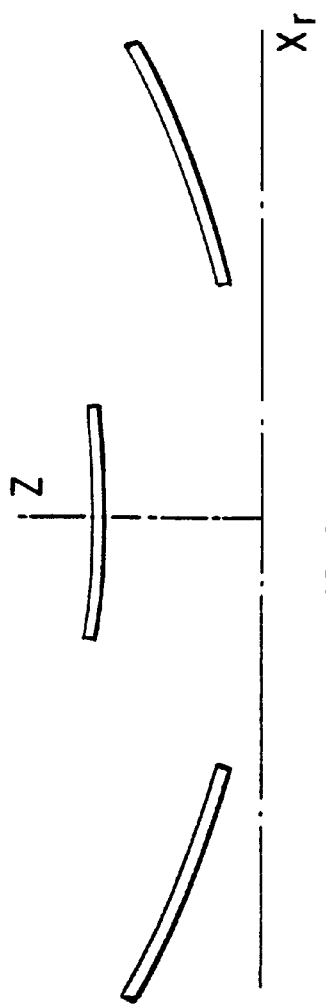
FIG. 14 is a graph of the cross-section of the dish along F'-E-F (or G'-E-G) in FIG. 13, in side view, plan view and right view.
Figure 14C:
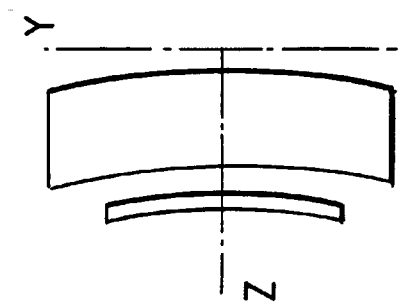
Figure 14B:
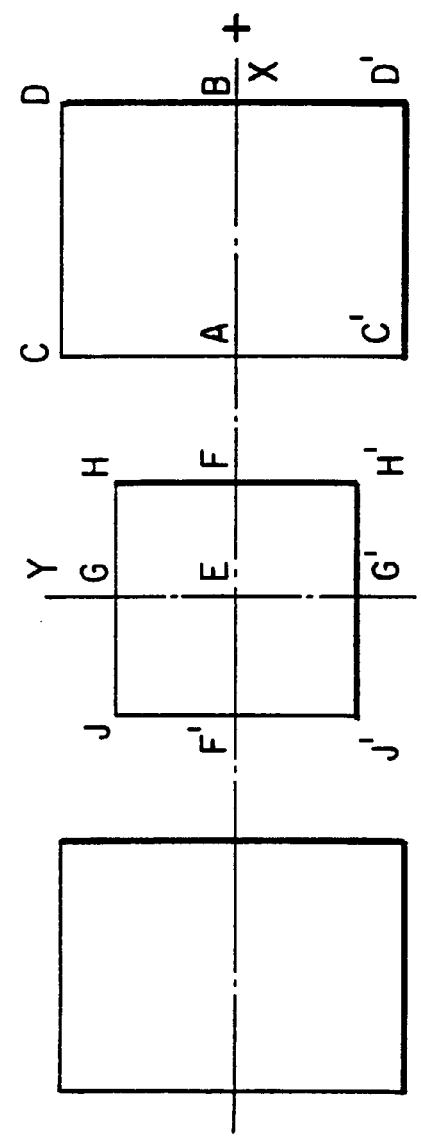

FIG. 14 is a graph of the cross-section of the dish along F'-E-F (or G'E-G) in FIG. 13. The drawing in the upper left depicts a side view of the antenna; the drawing in the lower left depicts a plan view of the antenna; and the drawing in the lower right depicts a right view of the antenna. The graph depicts the height of the center section of the antenna above E, which is the center point of the center section.

TABLE I

Surface heights for central dish

| edge | 0 | 1 | 2 | 3 | 4 | 5 | 6 | 6.64 |
|---|---|---|---|---|---|---|---|---|
| 0 | E 0 | 1 | 5 | 11 | 20 | 31 | 45 | F 55 |
| 1 | 1 | 3 | 6 | 13 | 21 | 33 | 46 | 56 |
| 2 | 5 | 6 | 10 | 16 | 25 | 36 | 50 | 60 |
| 3 | 11 | 13 | 16 | 23 | 31 | 44 | 56 | 66 |
| 4 | 20 | 21 | 25 | 31 | 48 | 51 | 65 | 75 |
| 5 | 31 | 33 | 36 | 43 | 51 | 63 | 76 | 87 |
| 6 | 45 | 46 | 50 | 56 | 65 | 76 | 90 | 100 |
| 6.64 | 55 G' | 56 | 60 | 66 | 75 | 87 | 100 | 110 H' |

Each wing is a rectangular segment of a paraboloid of focal length 28.8 inches (C-D-D'-C) in FIG. 13. The inner edge CC' is situated at a distance 14.0 inches from the axis of the central dish, measured in the level plane. With respect to the (x,y,z) coordinate system indicated in FIG. 13½, the positions of representative points are as given in Table II.

The height of the surface of the wings at radial distance r in inches measured in the level plane from the axis of the central square dish, is expressible as $r^2/115.2$. For example, at point A in FIG. 13, which is 14.01 inches from E, measured horizontally, the height is $14.01 \times 4.01/115.2 = 1.704$ inches (compare line 1 of Table II).

TABLE II

Coordinates of representative points

| Point | x | y | z |
|---|---|---|---|
| A | 14.01 | 0 | 1.7 |
| B | 28.76 | 0 | 7.18 |
| C | 14.01 | 9.59 | 2.5 |
| D | 28.76 | 9.59 | 7.98 |
| E | 0 | 0 | 8.95 |
| F | 6.64 | 0 | 9.4 |
| G | 0 | 6.64 | 9.94 |
| H | 6.64 | 6.64 | 9.95 |

Table III gives the depth of the wing relative to the plane passing through the corners C, D, D', and C'. Only one half of the rectangle is tabulated.

TABLE III

Wing surface heights in hundredths of an inch.

| | Edge | 1 | 2 | 3 | 4 | 5 | 6 | 7 | 8 | 9 | 10 | 11 | 12 | 13 | 14 | 15 | 15.74 | |
|---|---|---|---|---|---|---|---|---|---|---|---|---|---|---|---|---|---|---|
| A | 85 | 97 | 108 | 117 | 124 | 129 | 133 | 135 | 136 | 135 | 132 | 128 | 122 | 115 | 106 | 95 | 86 | B C/L 0 |
| | 85 | 97 | 107 | 116 | 123 | 128 | 132 | 134 | 135 | 134 | 131 | 127 | 121 | 114 | 105 | 94 | 85 | 1 |
| | 82 | 94 | 104 | 113 | 120 | 126 | 129 | 132 | 132 | 131 | 129 | 124 | 118 | 111 | 102 | 91 | 82 | 2 |
| | 77 | 89 | 100 | 108 | 115 | 121 | 125 | 127 | 128 | 127 | 124 | 120 | 114 | 106 | 97 | 88 | 77 | 3 |
| | 71 | 83 | 93 | 102 | 109 | 114 | 118 | 121 | 121 | 120 | 118 | 113 | 107 | 100 | 91 | 88 | 71 | 4 |
| | 62 | 74 | 85 | 93 | 101 | 106 | 110 | 112 | 113 | 112 | 109 | 105 | 99 | 92 | 82 | 72 | 63 | 5 |
| | 52 | 64 | 75 | 83 | 90 | 96 | 100 | 102 | 103 | 102 | 99 | 95 | 89 | 81 | 72 | 61 | 52 | 6 |
| | 48 | 52 | 62 | 71 | 78 | 84 | 88 | 90 | 91 | 30 | 27 | 83 | 77 | 69 | 60 | 49 | 40 | 7 |
| | 26 | 38 | 49 | 57 | 64 | 70 | 74 | 76 | 77 | 76 | 73 | 69 | 63 | 55 | 46 | 35 | 27 | 8 |
| | 10 | 22 | 33 | 42 | 49 | 54 | 58 | 60 | 61 | 68 | 57 | 53 | 47 | 40 | 31 | 20 | 11 | 9 |
| C' | 0 | 12 | 23 | 31 | 39 | 44 | 48 | 50 | 51 | 50 | 47 | 43 | 37 | 29 | 20 | 10 | 0 | 9.53 D' |

The surface of the model is electrically conducting and generally smooth. The present embodiment does not differ from the tabulated values by more than 0.15 in r.m.s.

A frame of electrically nonconducting material holds the dish and two wings in position relative to each other as in Table III, within an accuracy of ±0.05 inches. The frame should be rigid, robust, and portable. It is possible to affix other elements, especially a feed support bracket or brackets and electrical cables.

While the above description referred to placing narrow nulls in specific locations, the present invention would also operate if the nulls were replaced by broad attenuation at these same locations. All that is required is to adequately reduce the signal strength below the threshold at which interfering signals would impair reception. While this threshold varies with each implementation, attenuating the signals by 10 dB should be sufficient.

Furthermore, while the above description created these nulls by placing gaps between the main reflector and the two side reflectors, any effective gap would also suffice. An effective gap is defined herein as a place where the area in the antenna is reduced significantly but not to zero. Thus, a "neck" could exist between the main reflector and each of the two side reflectors, but not a gap. Such a design may have particular advantageous properties, such as ease of fabrication.

In addition, the above antenna design described a symmetrical antenna An asymmetrical antenna would also suffice, as long as the signal strength of the interfering signals was reduced below the above threshold.

Finally, the antenna of the present invention would work in applications where the underlying data was something other than television. The antenna will apply to any system in which the user desires to reduce the size of the antenna to a point at which its beam width no longer covers only one satellite, but rather is now receiving interfering signals from satellites near the satellite of interest as well as the desired signal.

Finally, while electronic phase cancellation techniques are known, they are very expensive due to the complex equipment involved. The present invention performs its aperture synthesis without the benefit of complex electronics.

Description of the Spectral Shaping Technique

The present invention uses a bandwidth spreading technique to reduce the power density below the FCC thresholds for each of the systems. This technique also reduces the effect of interfering signals on the received signal.

The present invention uses a Shaped Frequency Shift Key (SFSK) modulation scheme to spread the energy of the transponder smoothly over the bandwidth of the satellite transponder, which in the case of the C-Band system spreads the signal over the 30 MHz of the current C-Band satellite transponder. Frequency Shift Keying (FSK) is a commonly known modulation technique. Minimal Shift Keying (MSK) is an FSK signal shifted in such a way as to minimize the frequency spreading. By "SFSK" we mean any of many shapes of frequency versus time patterns that will occupy the wider bandwidth without losing power efficiency. By spreading the bandwidth from 5 MHz to 30 MHz using the SFSK modulation technique, the power density is reduced below the FCC limitation.

The SFSK signals themselves have a "coding gain" approximately equal to the transponder bandwidth divided by the data rate, a protection achieved for any power efficient modulation scheme. This amounts to a protection factor of between three and ten depending on the number of television signals of the present invention in one satellite transponder.

Three different SFSK modulation shapes are available, depending on whether the transponder of the present invention uses one, two or three channels, which depends on the power from the transponder. A transponder radiating its signal at 30–31 dB EIRP transmits one television channel using a particular SFSK modulation; a transponder radiating its signal at 31–33 dB EIRP transmits two channels using a different modulation; and a transponder radiating its signal at 35 dB or greater EIRP can transmit three channels using a third modulation.

One possible embodiment of this aspect of the present invention uses Manchester Encoding for the three channel implementation. For example, if the information data rate is 5 megabits per second (MBPS) per channel, the total information data rate becomes 15 MBPS. By coding the information bits into two transmitted bits using Manchester Encoding, the 15 MBPS signal will be transformed into a 30 MBPS signal, which easily occupies the 30 MHz bandwidth of the transponder.

For the two channel implementation, i.e., a 10 MBPS signal must be transformed into a 30 MBPS signal. This can be accomplished by using three data bits per information bit, i.e., triple redundancy. As before, the resulting 30 MBPS signal can easily occupy the 30 MHz bandwidth available on the satellite transponder.

For the one channel implementation, i.e., a 5 MBPS signal would be transformed into a 30 MBPS signal, which can be accomplished using a 6 data bits per information bit. The modulation desired can be accomplished using digital bit expansion as above followed by spectral shaping, or alternatively, by any of a number of shaping filters on the transmitter and matched filters on the receiver.

In addition to modifying the spectrum to occupy the full bandwidth available as described above, the present invention modifies the number of channels depending upon the transponder EIRP available on the chosen satellite. For example, if the satellite transponder has only 31 dB EIRP available, then the system of the present invention will send only one channel via that satellite. Additional protection is therefore automatically provided by the resulting coding gain, e.g., 30 MHz/5 MBPS, which is a factor of six. For example, if the satellite transponder has only 33 dB EIRP available, then the system of the present invention will send two channels via that satellite. Additional protection is therefore automatically provided by the resulting coding gain, e.g., 30 MHz/10 MBPS, which is a factor of three. Finally, if the satellite transponder has 35 dB EIRP or more available, then the system of the present invention will send three channels via that satellite. No additional protection is necessary.

The adjustment of number of channels for a given satellite EIRP equalizes the interference performance of the system. Normally the satellite radiating a stronger signal, such as 35 dB EIRP, would provide three times the interference to a weaker signal at 30 dB, for example, from an adjacent satellite. As a result, the signal from the higher power satellite would require one-third the coding gain to protect it from the signal from the weaker satellite. Using only one television channel on the satellite radiating the weaker signal automatically provides the required improvement in protection for the weaker satellite. The choice of SFSK modulation type and channels per transponder is deliberately made to equalize the protection needed by the antenna pattern and the television demodulator no matter which of the satellites is being received in a constellation of satellites of unequal power.

Description of the Video Compression Technique

The present invention incorporates existing data compression techniques. All that is required is a data compression algorithm that reduces the data by a factor of about ten. The embodiment of the present invention uses a commercially available product from Scientific Atlanta to provide the required video data compression. This same product will suffice in all embodiments, i.e., the C-, S-, L-, Ku- and Ka-Band systems.

Description of the C-Band and Ku-Band Communication Systems

Figure 10:
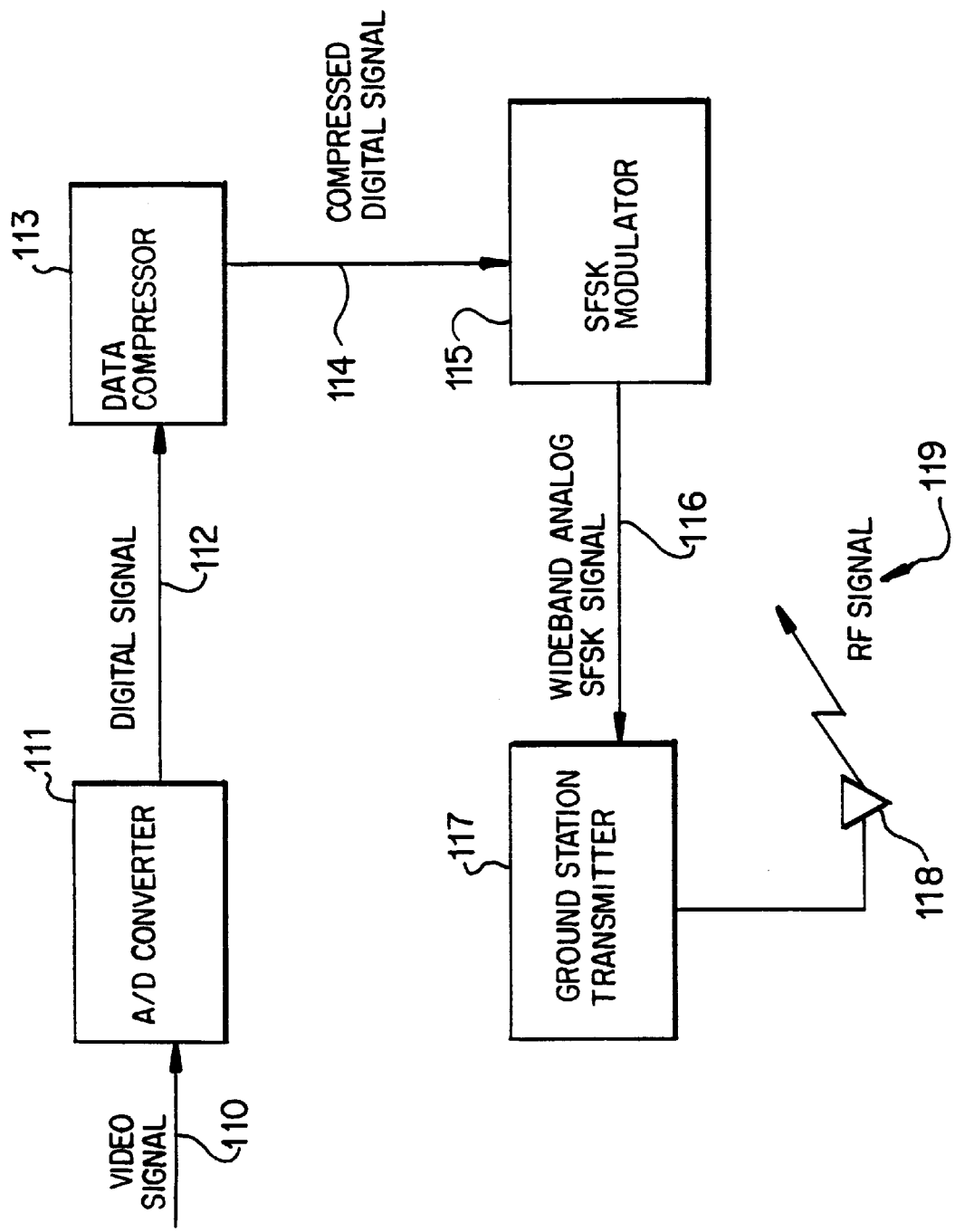
FIG. 10 depicts an embodiment of the satellite portion of the present invention operating in C-Band.

The basic embodiment of a system for transmitting the signal of the present invention is depicted in FIG. 10. The general block diagram will not vary when the system is changed to a different band, such as Ku-, Ka-, L- or S-Band. The only change occurs in the satellite transmitter 117 and the antenna 118, which now radiate the signal to the satellite at a different RF frequency.

Figure 15:
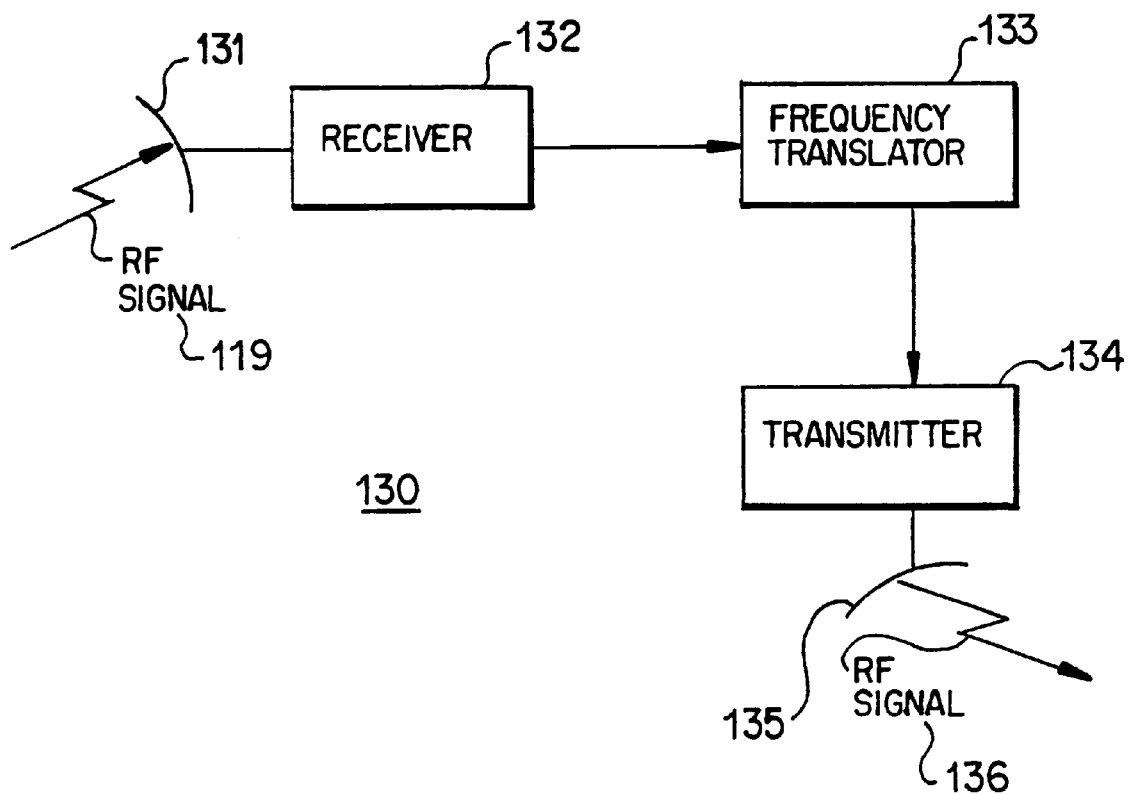
FIG. 15 depicts a satellite receiving the signal of the present invention and retransmitting the signal back to earth.

The system operates as follows. FIG. 10 depicts the ground transmitter of the present invention. The video signal 110 is converted by an analog to digital converter 111 into a digital signal 112. The digital signal 112 is converted into a compressed digital signal 114 by the data compressor 113, which has been described above. The compressed digital signal 114 is modulated by the SFSK modulator 115 into a wideband analog SFSK uplink signal 116, using the modulation technique described above. The ground station transmitter 117 transmits this wideband analog SFSK signal using the ground station antenna 118, which radiates the RF signal 119 to the satellite. A satellite transponder 130, which is depicted in FIG. 15, receives the incoming wideband analog SFSK signal 119 with antenna 131, passes it to receiver 132 which outputs the SFSK signal to frequency translator 133, which shifts the signal in frequency to a desired downlink frequency, such as a C-Band frequency, for example, which is different than the uplink frequency to prevent interference. The transmitter 134 outputs the wideband analog SFSK signal at that frequency and radiates the RF signal 136 towards the earth.

The RF signal constitutes a broadband signal centered at the carrier frequency of the satellite transponder, which in the C-Band system is approximately 4 GHz. The details of the link are set forth below.

Figure 11:
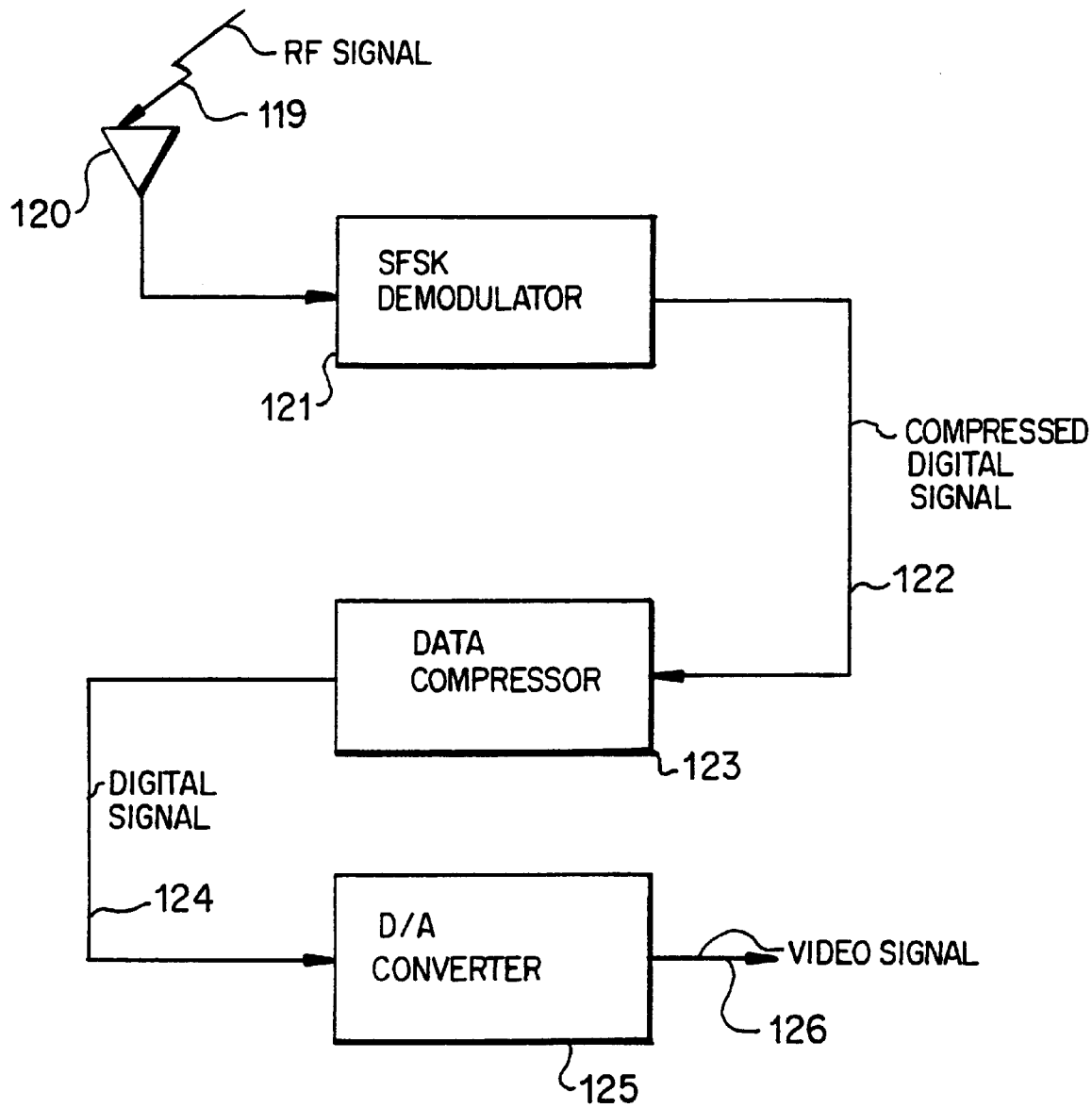
FIG. 11 depicts an embodiment of the ground station portion of the present invention

FIG. 11 depicts the ground portion of an embodiment of the present invention. The antenna 120, which is of the type described above, receives the RF signal 136 transmitted from the satellite, along with interfering signals and noise. The antenna 120 outputs the received signal to an SFSK demodulator 121, which converts the received signal into a compressed digital signal 122 that approximates the compressed digital signal 114 from FIG. 10. The SFSK demodulator outputs this compressed digital signal 122 to a data restorer or decompressor 123, which converts the compressed digital signal 122 into a digital signal that approximates the digital signal 112 from FIG. 10. The data decompressor passes the digital signal 124 to a digital to analog converter 125, which converts the digital signal 124 to a video signal 126 that resembles the video signal 110 in FIG. 10. Thus, the system communicates the video signal from the ground transmitter, shown in FIG. 10, via a satellite transponder 130 to a user on the ground, who is able to employ an antenna with a receiving area equivalent to a dish having a three foot or less diameter, yet which satellite does not violate FCC regulations regarding transmitted power. Additional control and data transmission signals of lower overall data rate can be added at transmitter and receiver to manage billing and to deliver additional information to the user. Typically, the data compression and expansion include encryption techniques to protect proprietary materials. Furthermore, error correction and detection techniques may also be employed without corrupting the present invention. The exact RF signal levels will be set forth below in the link equations.

The physical equations that define the relations between the transmitted satellite radio power and the size of the dish antennas are usually called the "link equations." In normal algebraic form they define the ratio of signal power received, $P_r$, to noise power received, $P_n$. The signal power received is determined by:

$$P_r = \frac{P_s G_s \eta A_r}{4\pi R^2 A_b} \tag{10}$$

where:

$P_s$=transmitted satellite power;

$G_s$=satellite antenna gain, the ability to focus the power on just the country being served;

$\eta A_r$=the effective area of the receive antenna;

$\pi$=3.1415927;

R the distance from satellites to ground station, typically;

$A_b$=absorption factor due to rain and atmosphere.

The noise power received by the antenna is a function of temperature, and can be determined by:

$$P=kT_r B \tag{11}$$

where:

k=1.38×10–23, Boltzman's constant, a physical constant relating temperature of "black body" radiation;

$T_r$=effective radiation temperature of the receive station;

B=the bandwidth of the signal being received. television in its various forms has a bandwidth that varies from 4.7 MHz for normal broadcast, to 30 MHz for satellite FM television, and from to 1 MHz to 8 MHz for compressed digital television.

The required performance is given by a minimum ratio (C/N) of received signal power $P_r$, which is determined from equation (10), to noise $P_n$, which is determined from equation (11). Thus, C/N becomes:

$$\frac{C}{N} = \frac{P_r}{P_n} = \frac{P_s G_s \eta A_r}{4\pi R^2 kT_r B A_b} \tag{12}$$

The required ratio (C/N) is determined by the required television transmission mode and varies from normal broadcast television, to Satellite FM television relay, and to the new digital television broadcast. Since the choice of transmission mode defines the bandwidth B and the required (C/N) at the same time, these two parameters are usually grouped together:

$$B\frac{C}{N} \tag{13}$$

The required satellite power ($P_s$) can be defined in terms of the other system choices by factoring of terms in equation (12).

$$P_s = \frac{\frac{C}{N} B(4\pi R^2) A_b T_r k}{G_s \eta A_r} \tag{14}$$

Equation (14) contains the information relevant to the comparison of Satellite TV services offered in the two frequency bands, C-Band and Ku-Band. The satellite power, $P_s$, is the primary space segment cost factor because the scarce solar cell power has to be divided among the powers required for each transponder, which determines how much each channel shares in the total satellite cost.

The two factors shown in equation (13) are determined solely by the choice of the TV modulation type to be used. The most relevant types are normal broadcast TV, Satellite FM-TV, the type currently used in C-Band Satellites, and compressed video. Table IV below lists the values for these three types of TV transmission.

TABLE IV

| | Modulation Parameters, B · C/N | | |
|---|---|---|---|
| TV Type | B | C/N | B · C/N |
| Broadcast TV | 4.6 MHz | 3000 | 1380 × 10$^7$ |
| Satellite FM-TV | 30 MHz | 8 | 24 × 10$^7$ |
| Compressed Video | 5 MHz | 4 | 2.0 × 10$^7$ |

Normal broadcast television requires over 20 times greater power from the satellite than FM television. Even though some information agencies have proposed transmitting directly from satellites to home television sets, the need for twenty times the satellite power has proven to be impractical.

The standard satellite FM television has been used for years as the basic-technique for both C-Band and Ku-Band satellites. Until just recently it was the best available to minimize required satellite power. The advent of the new digital signal processors (DSPs) has made compressed digital television practical. The compression reduces the B•C/N parameter by a factor of 10, which means that without any other change in the system the satellite power or the antenna area can be reduced by a factor of 10 simply by changing to the new television system. The performance improvement applies to both Ku- and C-Bands, as well as S-, L- and Ka-Bands.

The range to the geosynchronous satellites, R, is typically 40,000 Km. As a result, the factor $4\pi R^2$ becomes $2\times10^{16}$ m$^2$, which is the same for both Ku-Band and C-Band.

The gain of the satellite, $G_s$, depends entirely on the area of the country to be covered. For normal coverage of the United States, a gain of approximately 25 dB, which is 300 in algebraic terms, is achievable. The satellite's gain is limited to 300 by the area of geographic coverage, whether C-Band or Ku-Band is used. To achieve this gain Ku-band must use a smaller satellite antenna, which results in some weight savings on the satellites, but not enough to much affect the satellite cost.

The total power in the satellites is also proportional to the effective area of the receive station antenna, $\eta A_r$. For an antenna with an efficiency of 60%, the effective area is $$\eta A_r = \frac{0.60 \pi d^2}{4} \tag{15}$$

A directly related parameter is the antenna gain given by the equation:

$$G = \frac{4\pi\eta A_r}{\lambda^2} \tag{16}$$

Table V gives the effective areas of several possible embodiment of antennas. The effective area is also independent of Ku-band or C-band frequency choice. The related gain is dependent on the frequency band chosen.

TABLE V

Effective Antenna Areas at 60% Efficiency

| Antenna Diameter (Inches) | (meters) | 60% Area | Gain at 4 GHz |
|---|---|---|---|
| 18 | 0.46 | 0.1 m² | 23.5 dB |
| 36 | 0.92 | 0.4 m² | 29.5 dB |
| 72 | 1.8 | 1.6 m² | 35.5 dB |

The remaining two parameters, $T_r$ and $A_b$, are strongly dependent on the choice of C-Band or Ku-Band frequency. C-Band frequencies are little effected by rain while Ku-Band frequencies, which are a lot closer to the rain absorption frequencies, are much worse. A lot of statistical data has been gathered to determine the margins required, the values used below are midway between extremes. The rain margin at C-Band frequencies is typically 0.8 dB, or 1.20 in algebraic terms. The rain margin for the same rates of rainfall at Ku-Band are 8 dB, which is a factor of 6.3 in algebraic terms. These absorption factors multiply the required satellite power directly. A C-Band transmission requires 1.2 times the power to overcome rain loss, while a Ku-Band transmission requires 6.3 times to overcome rain loss.

An added effect comes from noise radiation due to the rain itself. Without the absorption the receiver has a temperature at C-Band that is a little better than that available at Ku-Band. C-Band typically is 50° K. while Ku-Band is more typically 80° K. However, both noise temperatures are affected by added radiation from rain. The relationship is given by:

$$T_r' = T_r + 290 \frac{°(A_b - 1)}{A_b} \tag{17}$$

$T_r$ is the clear-sky receiver temperature. 50° K. for C-Band or 80° K. for Ku-Band. $A_b$ is the absorption factor in algebraic terms for the different frequencies, 1.2 for C-Band, 6.3 for Ku-Band. The result is $$C\text{-Band: } T_r' = 50° + 290 \frac{°(1.2 - 1)}{1.2} = 98° \text{ K} \tag{18}$$

$$Ku\text{-Band: } T_r' = 80° + 290 \frac{°(6.3 - 1)}{6.3} = 324° \text{ K} \tag{19}$$

These values can then be used in equation (14) to determine the satellite power $P_s$ required for a given choice of modulation antenna size and frequency band. For the first example we will choose Satellite FM TV transmitting to a 6-foot receiver at C-Band.

C-Band FM TV 6-foot antenna:

$$P_s = \frac{(24 \times 10^7) \times (1.38 \times 10^{-23}) \times (2 \times 10^{16}) \times 1.2 \times 98}{300 \times 1.6} = 16.2 \text{ watts} \tag{20}$$

Ku-Band FM TV 6-foot antenna:

$$P_s = \frac{(24 \times 10^7) \times (1.38 \times 10^{-23}) \times (2 \times 10^{16}) \times 6.3 \times 324}{300 \times 1.6} = 281 \text{ watts} \tag{21}$$

The above shows that C-Band into a six-foot antenna requires 16 watts per transponder, while Ku-Band into the same size receiver requires 281 watts if rain margins are accounted for.

The power levels can be expressed in Effective Isotropic Radiated Power (EIRP) using the formula:

$$EIRP = 10 \log_{10}(_s \times G_s) \tag{22}$$

For the U.S., coverage of $G_s$=300, the two cases become:
FM TV: C-Band: 6-foot receiver: EIRP=36.8 dBW
FM TV: Ku-Band: 6-foot receiver: EIRP=49.2 dBW The dishes used in C-Band are larger typically than 6 feet if the weaker satellites are being received, eight, ten, and even fifteen feet are used on fringe areas where signals are weaker.

The early Ku-Band satellites for the U.S. used up to 300 watt Ku-Band transmitters, leading to high space segment cost and often short transmitter lifetime. In Europe, where each country is smaller, allowing larger $G_s$, tubes of 100 watts were used in Ku-Band. Some systems have used smaller KuBand antennas but then suffer signal loss when rain occurs.

Equation (22) can be used with any of the combinations of antennas and modulation types discussed above. In Table VI, the combinations have been given for the stated alternatives.

TABLE VI

EIRP Modulation, Band & Antenna

| Band | Mod. | B · C/N | Ant. | $\eta A_r$ | $T_r'$ | $A_b$ | W | EIRP |
|---|---|---|---|---|---|---|---|---|
| C-Band | FM-TV | 24 × 10⁷ | 72" | 1.6 | 98 | 1.2 | 16.2 | 36.8 |
|  |  | 24 × 10⁷ | 36" | 0.4 | 98 | 1.2 | 64.8 | 42.8 |
|  |  | 24 × 10⁷ | 18" | 0.1 | 98 | 1.2 | 259 | 48.9 |
| Ku-Band | FM-TV | 24 × 10⁷ | 72" | 1.6 | 324 | 6.3 | 281 | 49.2 |
|  |  | 24 × 10⁷ | 36" | 0.4 | 324 | 6.3 | 1124 | 55.2 |
|  |  | 24 × 10⁷ | 18" | 0.1 | 324 | 6.3 | 4500 | 61.3 |
| C-Band | Dig. TV | 2.0 × 10⁷ | 72" | 1.6 | 98 | 1.2 | 1.62 | 26.8 |
|  |  | 2.0 × 10⁷ | 36" | 0.4 | 98 | 1.2 | 6.48 | 32.8 |
|  |  | 2.0 × 10⁷ | 18" | 0.1 | 98 | 1.2 | 25.9 | 38.9 |
| Ku-Band | Dig. TV | 2.0 × 10⁷ | 72" | 1.6 | 324 | 6.3 | 28.1 | 39.2 |
|  |  | 2.0 × 10⁷ | 36" | 0.4 | 324 | 6.3 | 112.4 | 45.2 |
|  |  | 2.0 × 10⁷ | 18" | 0.1 | 324 | 6.3 | 450.0 | 51.3 |

The receivers available to C-Band and Ku-Band for compressed Video can be slightly better than the parameter B•C/N assumed above, resulting in the reception with one or two dB less EIRP than listed in Table VI. The improvement comes from error correcting demodulation allowing lower B•C/N and therefore lower B•C/N.

The best approach however would appear to be to use the 36" antenna area with about 31 dB EIRP for one compressed video channel. This allows all existing satellites to be used.

The parameter B•C/N will increase directly proportional to the number of channels if multiple channels are combined on the same transponder. Two channels double the data rate and the satellite power. Three channels triple the data rate and satellite power.

This embodiment of the present invention uses the following design goals:

Compressed Video C-Band EIRP:
31 dBW 1 channel
34 dBW 2 channels
35.7 dBW 3 channels The increased number of channels with satellite EIRP has the effect of equalizing performance for a given sized antenna that has different satellites in the interference nulls of the antenna. An antenna receiving a 31 dBW satellite on its main beam but with an interferer at 2° away in orbit with 35.7 dBW needs three times the protection than if the interferer were of equal, i.e., 31 dBW, EIRP. The modulation of the present invention automatically compensates for this situation because if the central satellite has only one channel its coding gain, the protection given by the modulation, is three times better, as required.

Advantageous Embodiments

One advantageous embodiment of an antenna for receiving a signal transmitted from a constellation of satellites, which includes a central satellite and a plurality of satellites spaced at regular intervals from the central satellite includes two heavy attenuations matched to at least two pairs of satellites in the constellation that are immediately adjacent to the central satellite, wherein the two heavy attenuations prevent signals from the at least two pairs of adjacent satellites from interfering with a signal being transmitted from the central satellite.

Another advantageous embodiment of an antenna for receiving a signal from a central satellite in a constellation of satellites, which includes the central satellite and a plurality of satellites spaced at regular angular intervals from the central satellite relative to the antenna, comprises: a central reflector; a first side reflector; a second side reflector; a first effective gap between the central reflector and the first side reflector, the first effective gap having a significantly reduced area relative to an area of the central reflector and an area of the first side reflector; and a second effective gap between the central reflector and the second side reflector, the first effective gap having a significantly reduced area relative to the area of the central reflector and the area of the second side reflector, in which the first and second effective gaps create at least two nulls in received energy, which two nulls inhibit signals being transmitted from at least two pairs of satellites in the constellation that are immediately adjacent to the central satellite.

Another advantageous embodiment of an antenna for receiving a signal from a central satellite in a constellation of satellites, which includes the central satellite and a plurality of satellites spaced at regular angular intervals from the central satellite relative to the antenna comprises: a central reflector; a first side reflector; a second side reflector; a first effective gap between the central reflector and the first side reflector, the first effective gap having a significantly reduced area relative to an area of the central reflector and an area of the first side reflector; and a second effective gap between the central reflector and the second side reflector, the first effective gap having a significantly reduced area relative to the area of the central reflector and the area of the second side reflector, in which the first and second effective gaps create at least two regions of heavy attenuation in received energy, which two regions of heavy attenuation inhibit signals being transmitted from at least two pairs of satellites in the constellation that are immediately adjacent to the central satellite.

Another advantageous embodiment of the above antenna includes first and second side reflectors that are physically separate from the central reflector.

Another advantageous embodiment of an antenna for receiving a signal transmitted from a constellation of satellites, which includes a central satellite and a plurality of satellites spaced at regular angular intervals from the central satellite relative to the antenna comprises: a reflecting surface having an irregularly shaped contour that provides normal gain for a signal from the central satellite and low gain nulls for signals from the plurality of satellites, in which the low gain nulls prevent signals being transmitted from the plurality of satellites from interfering with a signal being transmitted from the central satellite.

An advantageous method for receiving a signal being transmitted from a constellation of satellites, which includes a central satellite and a plurality of satellites spaced at regular angular intervals from the central satellite relative to a receiving antenna, comprises the steps of: enhancing a signal being transmitted from the central satellite with a central reflector in the receiving antenna; inhibiting interfering signals being transmitted from the plurality of satellites by disposing a gap between a central reflector and each of two side reflectors in the receiving antenna; and selecting a width of the gap and widths of the central and two side reflectors so that energy from the interfering signals that impinges on the central reflector cancels out energy from the interfering signals that impinges on the two side reflectors.

Another advantageous method for receiving a signal being transmitted from a constellation of satellites, which includes at least a central satellite, a first adjacent satellite spaced from the central satellite by a first angular interval relative to a terrestrial receiving antenna, a second adjacent satellite spaced from the central satellite by a second angular interval that is twice the first angular interval, and a third adjacent satellite spaced from the central satellite by a third angular interval that is three times the first angular interval, comprises the steps of: enhancing a signal being transmitted from the central satellite with a central reflector in the receiving antenna; canceling interfering signals from the first, second and third adjacent satellites by: (i) placing a gap between the central reflector and each of two side reflectors in the receiving antenna; and (ii) selecting an east-west dimension of the main reflector relative to an east-west dimension of the side reflector such that energy of the interfering signals impinging upon the main reflector cancels with energy of the interfering signals impinging upon the side reflectors.

Another advantageous method for receiving a signal being transmitted simultaneously from a constellation of satellites, which includes at least a central satellite, a first adjacent satellite spaced from the central satellite by a first angular interval relative to a terrestrial receiving antenna, a second adjacent satellite spaced from the central satellite by a second angular interval that is twice the first angular interval, and a third adjacent satellite spaced from the central satellite by a third angular interval that is three times the first angular interval, comprises the steps of: enhancing a signal being transmitted from the central satellite with a central reflector in the receiving antenna; canceling a first interfering signal from the first adjacent satellite by: (i) placing a gap between the central reflector and each of two side reflectors in the receiving antenna; and (ii) selecting an east-west dimension of the main reflector relative to an east-west dimension of the side reflector such that energy of the first interfering signal impinging upon the main reflector cancels energy of the first interfering signal impinging upon the side reflectors; canceling a second interfering signal from the second adjacent satellite by: (i) selecting an area of the main reflector relative to an area of the side reflector such that energy of the second interfering signal impinging upon the main reflector cancels with energy of the second interfering signal impinging upon the side reflectors without changing the cancellation of the first interfering signal in the second step; and canceling a third interfering signal from the third adjacent satellite by selecting a north-south dimension of the side reflector such that the energy of the third interfering signal impinging upon the main reflector cancels with energy of the third interfering signal impinging upon the side reflectors without changing the cancellation of the second or first interfering signals in the second or third steps.

An advantageous embodiment of the previous method occurs when the third step of canceling further comprises the step of: (ii) controlling a gain of the feedhorn such that the energy of the second interfering signal impinging upon the main reflector cancels with the energy of the second interfering signal impinging upon the side reflectors.

An advantageous embodiment of one of the previous methods occurs when the second step of canceling further comprises the step of: (ii) controlling a gain of the feedhorn such that the energy of the second interfering signal impinging upon the main reflector cancels with the energy of the second interfering signal impinging upon the side reflectors.

An advantageous method for sending a quantity of data representing a video signal to a terrestrial antenna from a ground transmitter via a main satellite within a constellation of satellites, which includes at least two pairs of adjacent satellites that are adjacent to the main satellite and spaced at regular angular intervals from the main satellite relative to the terrestrial antenna, comprises the steps of: compressing the quantity of data to form a quantity of compressed data; modulating the quantity of compressed data into a broadband power efficient signal that spreads the quantity of compressed data across a wide bandwidth of the ground transmitter so that the broadband power efficient signal has 3 to 8 dB of coding gain; transmitting the broadband power efficient signal from the ground transmitter to the main satellite; retransmitting the broadband power efficient signal from the satellite; receiving the broadband power efficient signal with the terrestrial antenna; providing gain in the terrestrial antenna for the broadband power efficient signal being retransmitted from the main satellite; and inhibiting signals being transmitted from the at least two pairs of adjacent satellites that are independent of the signal being transmitted from the main satellite.

An advantageous embodiment of the previous method occurs when the seventh step of inhibiting further comprises providing a gap in the terrestrial antenna between a central reflector and two side reflectors, wherein a width of the gap and widths of the two side reflectors are matched to the regular angular intervals of the at least two pairs of adjacent satellites.

An advantageous method for sending a video signal to a terrestrial antenna from a ground transmitter via a constellation of satellites, which includes a central satellite and a plurality of satellites spaced at regular angular intervals from the central satellite relative to the terrestrial antenna, comprises the steps of: converting the video signal into a quantity of digital data; compressing the quantity of digital data to form a quantity of compressed digital data; modulating the quantity of compressed digital data into a broadband power efficient signal that spreads the quantity of compressed digital data across a bandwidth of the ground transmitter so that the broadband power efficient signal contains 3 to 8 dB of coding gain; transmitting the broadband power efficient signal from the ground transmitter to the main satellite; retransmitting the broadband power efficient signal from the main satellite; receiving the broadband power efficient signal with the terrestrial antenna; enhancing the broadband power efficient signal being transmitted from the central satellite with a central reflector in the terrestrial antenna; inhibiting interfering signals being transmitted from the plurality of satellites by disposing a gap between a central reflector and each of two side reflectors in the receiving antenna; and selecting a width of the gap and widths of the two side reflectors so that energy from the interfering signals that impinges on the central reflector cancels out energy from the interfering signals that impinges on the two side reflectors.

An advantageous method for sending a video signal to a terrestrial antenna from a ground transmitter via a constellation of satellites, which includes at least a central satellite, a first adjacent satellite spaced from the central satellite by a first angular interval relative to the terrestrial antenna, a second adjacent satellite spaced from the central satellite by a second angular interval that is twice the first angular interval, and a third adjacent satellite spaced from the central satellite by a third angular interval that is three times the first angular interval, comprises the steps of: converting the video signal into a quantity of digital data; compressing the quantity of digital data to form a quantity of compressed digital data; modulating the quantity of compressed digital data into a broadband power efficient signal that spreads the quantity of compressed digital data across a wide bandwidth of the ground transmitter so that the broadband power efficient signal contains 3 to 8 dB of coding gain; transmitting the broadband power efficient signal from the ground transmitter to the constellation of satellites; retransmitting the broadband power efficient signal from the constellation of satellite; receiving the broadband signal from the constellation of satellites with the terrestrial antenna; enhancing a broadband signal being transmitted from the central satellite with a central reflector in the terrestrial antenna; and canceling interfering signals from the first, second and third adjacent satellites by: (i) placing a gap between the central reflector and each of two side reflectors in the terrestrial antenna; and selecting an east-west dimension of the main reflector relative to an east-west dimension of the side reflector such that energy of the interfering signals impinging upon the main reflector cancels with energy of the interfering signals impinging upon the side reflectors.

An advantageous method for sending a video signal to a terrestrial antenna from a ground transmitter via a constellation of satellites, which includes at least a central satellite, a first adjacent satellite spaced from the central satellite by a first angular interval relative to the terrestrial antenna, a second adjacent satellite spaced from the central satellite by a second angular interval that is twice the first angular interval, and a third adjacent satellite spaced from the central satellite by a third angular interval that is three times the first angular interval, comprises the steps of: converting the video signal into a quantity of digital data; compressing the quantity of digital data to form a quantity of compressed digital data; modulating the quantity of compressed digital data into a broadband power efficient signal that spreads the quantity of compressed digital data across a wide bandwidth the ground transmitter so that the broadband power efficient signal contains 3 to 8 dB of coding gain; transmitting the broadband power efficient signal from the ground transmitter to the constellation of satellites; retransmitting the broadband power efficient signal from each of the satellites in the constellation of satellites; receiving the broadband power efficient signal with the terrestrial antenna; enhancing a main broadband power efficient signal being transmitted from the central satellite with a central reflector in the terrestrial antenna; canceling a first interfering signal from the first adjacent satellite by: placing a gap between the central reflector and each of two side reflectors in the terrestrial antenna; selecting an east-west dimension of the main reflector relative to an east-west dimension of the side reflector such that energy of the first interfering signal impinging upon the main reflector cancels energy of the first interfering signal impinging upon the side reflectors; and canceling a second interfering signal from the second adjacent satellite by: selecting an area of the main reflector relative to an area of the side reflector such that energy of the second interfering signal impinging upon the main reflector cancels with energy of the second interfering signal impinging upon the side reflectors without changing the cancellation of the first interfering signals in the eighth step; and canceling a third interfering signal from the third adjacent satellite by selecting a north-south dimension of the side reflector such that the energy of the third interfering signal impinging upon the main reflector cancels with energy of the third interfering signal impinging upon the side reflectors without changing the cancellation of the second or first interfering signals in the eighth or ninth steps.

An advantageous system for transmitting a video signal from a ground transmitter via a main satellite within a constellation of satellites to a terrestrial antenna, comprises: a ground transmitter comprising: (i) an analog to digital converter converting the video signal to a digital signal; (ii) a data compressor being coupled to the analog to digital converter and compressing the digital signal to form a compressed digital signal; (iii) a wideband modulator being coupled to the data compressor and modulating the compressed digital signal into a wideband analog shaped frequency shift keyed signal that contains 3 to 8 dB of coding gain; (iv) a satellite transmitter being coupled to the wideband modulator and outputting a wideband RF signal; and (v) a satellite antenna radiating the wideband RF signal to the main satellite at a power level such that when the wideband RF signal is retransmitted by the main satellite and reaches the earth's surface the wideband RD signal is at a power level that is below FCC limitations on satellite transmissions at ground level; a terrestrial antenna having a diameter such that a beam width of the terrestrial antenna encompasses more satellites in the constellation of satellites than the main satellite, receiving the wideband RF signal and outputting a received signal; a wideband demodulator being coupled to the terrestrial antenna and demodulating the received signal into a received compressed digital signal; a data decompressor being coupled to the wideband demodulator and converting the received compressed digital signal into a received digital signal; and a digital to analog converter being coupled to the data decompressor and converting the received digital signal into a received video signal.

An advantageous embodiment of the previous system occurs when the terrestrial antenna further comprises: a central reflector; a first side reflector; a second side reflector; a first gap between the central reflector and the first side reflector; and a second gap between the central reflector and the second side reflector, wherein the first and second gaps create at least two nulls in received energy, which two nulls inhibit signals being transmitted from the at least two pairs of adjacent satellites in the constellation.

An advantageous embodiment of the previous system occurs when the central reflector has a first parabolic reflecting surface, and the first and second side reflectors have a second parabolic reflecting surface.

An advantageous embodiment of the previous system occurs when the terrestrial antenna further comprises a fresnel step between the central reflector and the first and second side reflector.

An advantageous embodiment of the previous system occurs when a first parabola defining the first parabolic reflecting surface has a first focal length that is shorter than a second focal length of a second parabola defining the second parabolic reflecting surface.

An advantageous embodiment of the previous system occurs when the terrestrial antenna further comprises a feed horn, wherein the first and second gaps lie in an area obstructed from receiving signals from the central satellite by the feed horn.

An advantageous embodiment of the previous system occurs when a width of the central reflector is smaller in a north-south or vertical dimension than the first and second edge reflectors.

An advantageous embodiment of the previous system occurs when the first and second side sections are physically separate from the main section.

An advantageous receiver for receiving a video signal being broadcast via satellite to a terrestrial antenna as a wideband power efficient signal, comprises: a wideband demodulator being coupled to the terrestrial antenna and demodulating a received wideband power efficient signal being output from the terrestrial antenna, the received wideband power efficient signal containing 3 to 8 dB of coding gain, and the wideband demodulator converting the received wideband power efficient signal into a received compressed digital signal; a data decompressor being coupled to the wideband demodulator and decompressing the received compressed digital signal into a received digital signal; and a digital to analog converter being coupled to the data decompressor and converting the received digital signal into a signal resembling the video signal.

A ground station for receiving a broadband power efficient RF signal being broadcast via a constellation of satellites to a terrestrial user, comprises: a terrestrial antenna receiving the broadband RF signal being broadcast from the constellation of satellites, outputting a received wideband power efficient signal, and having a diameter such that a beamwidth of the terrestrial antenna encompasses a target satellite in the constellation and at least the two pairs of satellites adjacent to the target satellite in the constellation; a wideband demodulator being coupled to the terrestrial antenna and demodulating the received wideband power efficient signal being output from the terrestrial antenna into a received compressed digital signal; a data decompressor being coupled to the wideband demodulator and decompressing the received compressed digital signal into a received digital signal; and a digital to analog converter being coupled to the data decompressor and converting the received digital signal into a signal resembling the video signal being broadcast from the satellite.

A ground station for receiving a broadband power efficient RF signal being broadcast via a constellation of satellites to a terrestrial user, comprises: a terrestrial antenna receiving the broadband power efficient RF signal being broadcast from the constellation of satellites, outputting a received shaped frequency shift keyed signal, and having a diameter such that a beamwidth of the terrestrial antenna encompasses a target satellite in the constellation and at least the two pairs of satellites adjacent to the target satellite in the constellation; a shaped frequency shift keyed demodulator being coupled to the terrestrial antenna and demodulating a received shaped frequency shift keyed signal being output from the terrestrial antenna into a received compressed digital signal, wherein the received shaped frequency shift keyed signal contains 3 to 8 dB of coding gain; a data decompressor being coupled to the shaped frequency shift keyed demodulator and decompressing the received compressed digital signal into a received digital signal; and a digital to analog converter being coupled to the data decompressor and converting the received digital signal into a signal resembling the video signal being broadcast from the satellite.

A ground station for receiving a television signal being broadcast as a wideband power efficient RF signal from a main satellite within a constellation of satellites, which includes at least two pairs of adjacent satellites adjacent to the main satellite and spaced at regular angular intervals from the main satellite relative to the ground station, the ground station comprises: a terrestrial antenna receiving the wideband power efficient RF signal, outputting a received signal, and having a diameter such that a beamwidth of the terrestrial antenna encompasses the main satellite and the at least the two pairs of adjacent satellites; a wideband demodulator being coupled to the terrestrial antenna and demodulating the received signal into a received compressed digital signal, wherein the received signal contains 3 to 8 dB of coding gain; a data decompressor being coupled to the wideband demodulator and converting the received compressed digital signal into a received digital signal; and a digital to analog converter being coupled to the data decompressor and converting the received digital signal into a received television signal.

An advantageous embodiment of the previous ground station occurs when the terrestrial antenna further comprises: a central reflector; a first side reflector; a second side reflector; a first gap between the central reflector and the first side reflector; and a second gap between the central reflector and the second side reflector, wherein the first and second gaps create at least two nulls in received energy, which two nulls inhibit signals being broadcast from the at least two pairs of adjacent satellites.

An advantageous embodiment of the previous ground station occurs when the central reflector has a first parabolic reflecting surface, and the first and second side reflectors have a second parabolic reflecting surface.

An advantageous embodiment of the previous ground station occurs when the terrestrial antenna further comprises a fresnel step between the central reflector and the first and second side reflector.

An advantageous embodiment of the previous ground station occurs when a first parabola defining the first parabolic reflecting surface has a first focal length that is shorter than a second focal length of a second parabola defining the second parabolic reflecting surface.

An advantageous embodiment of the previous ground station occurs when a first parabola defining the first parabolic reflecting surface has a first focal length that is different than a second focal length of a second parabola defining the second parabolic reflecting surface.

An advantageous embodiment of the previous ground station occurs when the terrestrial antenna further comprises a feed horn, wherein the first and second gaps lie in an area obstructed from receiving signals from the central satellite by the feed horn.

An advantageous embodiment of the previous ground station occurs when a width of the central reflector is smaller in a north-south or vertical dimension than the first and second edge reflectors.

An advantageous embodiment of the previous ground station occurs when the first and second side sections are physically separate from the main section.

A ground station for receiving a video signal being broadcast as a wideband power efficient RF signal to a terrestrial user via a main satellite within a constellation of satellites, which includes at least two pairs of satellites adjacent to the main satellite and spaced at regular angular intervals relative to the terrestrial user, comprises: a terrestrial antenna receiving the wideband power efficient RF signal and outputting a received signal, and including an irregularly shaped contour that provides normal gain for a signal from the main satellite and low gain nulls for signals from the at least two pairs of satellites, wherein the low gain nulls prevent signals from the at least two pairs of satellites from interfering with a signal being transmitted from the main satellite; a shaped frequency shift keyed demodulator being coupled to the terrestrial antenna and demodulating the received signal into a received compressed digital signal; a data decompressor being coupled to the shaped frequency shift keyed demodulator and converting the received compressed digital signal into a received digital signal; and a digital to analog converter being coupled to the data decompressor and converting the received digital signal into a received video signal available to the user.

A satellite within a constellation of satellites for retransmitting a signal to a terrestrial antenna, which has a diameter such that a beamwidth of the terrestrial antenna encompasses the satellite as well as other satellites within the constellation of satellites, comprises: a satellite receiver receiving a shaped frequency shift keyed signal being transmitted from a ground transmitter, which shaped frequency shift keyed signal contains 3 to 8 dB of coding gain; a satellite transmitter being coupled to the satellite receiver and retransmitting the shaped frequency shift keyed signal; and a satellite antenna radiating a wideband RF signal at a power level such that when the wideband RF signal reaches the earth's surface the wideband RF signal is below FCC limitations on radiated satellite power at ground level.

A geosynchronous satellite within a constellation of geosynchronous satellites for transmitting a C-Band signal to a terrestrial antenna, which has a diameter such that a beamwidth of the terrestrial antenna encompasses the geosynchronous satellite as well as other geosynchronous satellites within the constellation of satellites that are also transmitting C-Band signals, the satellite comprises: a satellite receiver receiving a wideband power efficient RF signal from a ground transmitter, which wideband power efficient RF signal contains 3 to 8 dB of coding gain; a satellite transmitter being coupled to the satellite receiver and outputting the wideband power efficient RF signal at a C-Band frequency; and a satellite antenna radiating the wideband power efficient RF signal at a power level equal to or less than 36 db EIRP.

A geosynchronous satellite within a constellation of geosynchronous satellites for transmitting a Ku-Band signal to a terrestrial antenna, which has a diameter such that a beamwidth of the terrestrial antenna encompasses the geosynchronous satellite as well as other geosynchronous satellites within the constellation of satellites that are also transmitting Ku-Band signals, the satellite comprises: a satellite receiver receiving a wideband power efficient RF signal from a ground transmitter, wherein the wideband power efficient RF signal contains 3 to 8 dB of coding gain; a satellite transmitter being coupled to the satellite receiver and outputting the wideband power efficient RF signal at a Ku-Band frequency; and a satellite antenna radiating the wideband power efficient RF signal at a power level equal to or less than 48 db EIRP.

An apparatus for transmitting a television signal to a satellite within a constellation of satellites, for broadcast back to earth to a terrestrial antenna, the apparatus comprises: an analog to digital converter converting the television signal to a digital television signal; a data compressor being coupled to the analog to digital converter and compressing the digital television signal to a compressed digital signal; a modulator modulating the compressed digital signal into a wideband power efficient signal that contains 3 to 8 dB of coding gain; an RF transmitter being coupled to the modulator and transmitting the wideband power efficient signal to a satellite at an RF power level such that when the wideband power efficient signal is retransmitted from the satellite and reaches earth the wideband power efficient signal lies within FCC limitations on satellite transmissions at ground level.

An advantageous embodiment of the previous apparatus occurs when the RF transmitter transmits the wideband power efficient signal to a geosynchronous satellite at a power level such that the geosynchronous satellite retransmits the wideband power efficient signal at a power level equal to or less than 36 dB EIRP and at a C-Band frequency.

An advantageous embodiment of the previous apparatus occurs when the RF transmitter transmits the wideband power efficient signal to a geosynchronous satellite at a power level such that the geosynchronous satellite retransmits the wideband power efficient signal at a power level equal to or less than 48 dB EIRP and at a Ku-Band frequency.

What is claimed is:

1. A system for transmitting a video signal to a terrestrial user via a main satellite within a constellation of satellites, which includes at least two pairs of satellites adjacent to the main satellite and spaced at regular angular intervals relative to the terrestrial user, comprising:

a) an analog to digital converter converting the video signal to a digital signal;

b) a data compressor being coupled to the analog to digital converter and compressing the digital signal to form a compressed digital signal;

c) a shaped frequency shift keyed modulator being coupled to the data compressor and modulating the compressed digital signal into a wideband analog shaped frequency shift keyed signal that contains 3 to 8 dB of coding gain;

d) a satellite transmitter being coupled to the shaped frequency shift keyed modulator and outputting a wideband RF signal;

e) a satellite antenna radiating the wideband RF signal to the main satellite within the constellation of satellites, which wideband RF signal is retransmitted by the main satellite back to earth;

f) a terrestrial antenna receiving the wideband RF signal, outputting a received signal, and having a diameter such that a beamwidth of the terrestrial antenna encompasses the main satellite and the at least the two pairs of adjacent satellites in the constellation;

g) a shaped frequency shift keyed demodulator being coupled to the terrestrial antenna and demodulating the received signal into a received compressed digital signal;

h) a data decompressor being coupled to the shaped frequency shift keyed demodulator and converting the received compressed digital signal into a received digital signal; and i) a digital to analog converter being coupled to the data decompressor and converting the received digital signal into a received video signal available to the user, wherein the terrestrial antenna further comprises:
   (i) a central reflector;
   (ii) a first side reflector;
   (iii) a second side reflector;
   (iv) a first gap between the central reflector and the first side reflector; and
   (v) a second gap between the central reflector and the second side reflector, wherein said first and second gaps create at least two pairs of nulls in received energy, which two nulls inhibit signals being transmitted from said at least two pairs of adjacent satellites in the constellation.

2. The system according to claim 1, wherein the nulls in received energy are within a main beam of an antenna pattern of the terrestrial antenna.

3. The system according to claim 1, wherein the central reflector has a first parabolic reflecting surface, and the first and second side reflectors have a second parabolic reflecting surface.

4. The system according to claim 3, wherein the central reflector of the terrestrial antenna is separated from the first side reflector and from the second side reflector by a fresnel step.

5. The system according to claim 3, wherein a first parabola defining the first parabolic reflecting surface has a first focal length that is shorter than a second focal length of a second parabola defining the second parabolic reflecting surface.

6. The system according to claim 1, wherein the terrestrial antenna further comprises a feed horn, wherein the first and second gaps lie in an area obstructed from receiving signals from the central satellite by the feed horn.

7. The system according to claim 1, wherein a width of the central reflector is smaller in a north-south or vertical dimension than the first and second edge reflectors.

8. The system according to claim 1, wherein the first and second side sections are physically separate from the main section.

9. A system for transmitting a video signal to a terrestrial user via a main satellite within a constellation of satellites, which includes at least two pairs of satellites adjacent to the main satellite and spaced at regular angular intervals relative to the terrestrial user, comprising:

a) an analog to digital converter converting the video signal to a digital signal;

b) a data compressor being coupled to the analog to digital converter and compressing the digital signal to form a compressed digital signal;

c) a shaped frequency shift keyed modulator being coupled to the data compressor and modulating the compressed digital signal into a wideband analog shaped frequency shift keyed signal that contains 3 to 8 dB of coding gain;

d) a satellite transmitter being coupled to the shaped frequency shift keyed modulator and outputting a wideband RF signal;

e) a satellite antenna radiating the wideband RF signal to the main satellite, which wideband RF signal is retransmitted by the main satellite back to earth;

f) a terrestrial antenna receiving the wideband RF signal, outputting a received signal, having a diameter such that a beamwidth of the terrestrial antenna encompasses the main satellite and the at least two pairs of adjacent satellites in the constellation, and including an irregularly shaped contour that provides normal gain for a signal from the main satellite and low gain nulls for signals from the at least two pairs of adjacent satellites, wherein the low gain nulls prevent signals being transmitted from the at least two pairs of adjacent satellites from interfering with a signal being transmitted from the main satellite;

g) a shaped frequency shift keyed demodulator being coupled to the terrestrial antenna and demodulating the received signal into a received compressed digital signal;

h) a data decompressor being coupled to the shaped frequency shift keyed demodulator and converting the received compressed digital signal into a received digital signal; and i) a digital to analog converter being coupled to the data decompressor and converting the received digital signal into a received video signal available to the user, wherein the irregularly shaped contour of the terrestrial antenna has at least three primary areas separated by effective gaps, each gap having a width that is a function of the regular angular intervals of the constellation of satellites.

10. The system according to claim 9, wherein the three primary areas include a central area and two side areas, an east-west dimension of the central area relative to an east-west dimension of the side areas is such that energy of the signals being transmitted from the at least two pairs of adjacent satellites impinging upon the central area cancels with energy of the signals being transmitted from the at least two pairs of adjacent satellites impinging upon the side areas.

* * * * *